(12) United States Patent
Kawamura et al.

(10) Patent No.: US 6,477,606 B1
(45) Date of Patent: Nov. 5, 2002

(54) BUS SYSTEM AND A MASTER DEVICE THAT STABILIZES BUS ELECTRIC POTENTIAL DURING NON-ACCESS PERIODS

(75) Inventors: Osamu Kawamura, Kadoma (JP);
Tomohiko Kitamura, Hirakata (JP);
Tsutomu Sekibe, Neyagawa (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/378,548

(22) Filed: Aug. 20, 1999

(30) Foreign Application Priority Data

Aug. 21, 1998 (JP) .......................................... 10-235280

(51) Int. Cl.⁷ .......................... G06F 13/14; G06F 1/32; H03K 19/003
(52) U.S. Cl. .......................... 710/305; 713/320; 326/31
(58) Field of Search ..................... 713/320; 326/21–34; 710/305

(56) References Cited

U.S. PATENT DOCUMENTS

| | | | | | |
|---|---|---|---|---|---|
| 4,454,591 A | * | 6/1984 | Lou | ........................... | 710/126 |
| 4,766,334 A | * | 8/1988 | Warner | ......................... | 326/56 |
| 5,087,840 A | * | 2/1992 | Davies et al. | ................. | 326/83 |
| 5,109,493 A | * | 4/1992 | Banerjee | ..................... | 713/320 |
| 5,291,080 A | * | 3/1994 | Amagasaki | ................. | 327/333 |
| 5,305,443 A | * | 4/1994 | Franzo | ......................... | 710/126 |
| 5,361,364 A | | 11/1994 | Nagashige et al. | | |
| 5,450,356 A | * | 9/1995 | Miller | .................... | 365/189.05 |
| 5,479,619 A | | 12/1995 | Nagashige et al. | | |
| 5,502,824 A | * | 3/1996 | Heil | ........................... | 710/113 |
| 5,532,630 A | * | 7/1996 | Waggoner et al. | ........... | 327/108 |
| 5,651,126 A | * | 7/1997 | Bailey et al. | ................... | 711/1 |
| 5,675,812 A | | 10/1997 | Nagashige et al. | | |
| 5,740,454 A | * | 4/1998 | Kelly et al. | .................. | 713/320 |
| 5,892,958 A | | 4/1999 | Nagashige et al. | | |
| 5,952,850 A | * | 9/1999 | Hojo et al. | .................... | 326/83 |

FOREIGN PATENT DOCUMENTS

| | | |
|---|---|---|
| JP | 5011898 | 1/1993 |
| JP | 5012204 | 1/1993 |

* cited by examiner

*Primary Examiner*—Sumati Lefkowitz
(74) *Attorney, Agent, or Firm*—Price and Gess

(57) ABSTRACT

A master device in a system including a bidirectional bus and at least one device manages whether the system is in an access state in which the master device permits an access to or from one device or a non-access state in which the master device permits an access to none of the devices. The master device drives the bidirectional bus using a predetermined current to transfer data to or from one device connected to the bidirectional bus when the system is in the access state. When the state of the system changes from the access state to the non-access state, the master device drives the bidirectional bus in order to stabilize the potential of the bidirectional bus to keep the bus potential from changing when the system is in a non-access state, thereby eliminating the need for conventional pull-up/pull-down resistors for stabilizing the bus potential during a non-access state.

6 Claims, 20 Drawing Sheets

BUS SYSTEM AND A MASTER DEVICE THAT STABILIZES BUS ELECTRIC POTENTIAL DURING NON-ACCESS PERIODS

BACKGROUND OF THE INVENTION

1. Field of the Invention

The present invention relates to a bus system and a master device used in the bus system.

2. Description of the Background Art

A microcomputer built into an electronic data appliance or a household electrical appliance has a bus system. Such a bus system includes a uni-directional bus and/or a bidirectional bus that is connected to a master device and slave devices. Here, a master device refers to a device, such as a CPU or a Direct Memory Access Controller (DMAC), that determines whether to permit other devices to access a slave device via a bus, and a slave device refers to a device, such as a memory or an input/output (I/O) controller, which is accessed according to an access permission signal from the master device.

In such a system, the wiring that forms the buses takes up a large proportion of the area of a printed circuit board (PCB). As these conductors are subject to noise from both inside and outside of the appliance, a master device and slave devices connected to the buses drive the buses by providing relatively large currents.

Driving of a bus with a large current stabilizes the electric potential of the bus during an access period, but at the same time destabilizes the bus potential during a non-access period where master devices and slave devices are not permitted to perform accesses via the bus. This may cause a processor or a slave device connected to the bus to malfunction, or even lead to a breakdown of the processor or the slave device. FIG. 1A is a timing chart showing states where the bus potential is undefined during non-access periods.

The timing chart shows an access permission signal outputted by a master device and the bus potential during periods 131–135. A period in which the access permission is signal is high indicates an access period. As is clear from the chart, the bus potential is low in access period 132 and high in access period 134, while it is undefined without reaching to either a high or low level in non-access periods 131, 133, and 135.

The following explains a method conventionally used in a bus system to stabilize the bus potential during a non-access period.

In the conventional method, pull-up resistors are connected to a bidirectional bus to stabilize a bus potential as shown in FIG. 1B. This figure shows the construction of a bus system in which a CPU (a master device) and three devices (slave devices) are connected to a uni-directional bus and the bidirectional bus that is connected to pull-up resistors RI. The uni-directional bus carries addresses, and the bidirectional bus carries data. FIG. 1C is a timing chart showing an access permission signal and a bus potential in the bus system shown in FIG. 1B. The access permission signal is similar to that shown in FIG. 1A, while the bus potential is different, which is to say, the bus potential is high and stabilized due to the pull-up resistors R1 during non-access periods 131, 133, and 135, during which the bus potential is undefined in FIG. 1A.

This conventional method, however, has a problem during an access period where the bus potential is low. This is to say, when the potential of the bidirectional bus is low, currents flow away from the power-supply line to ground through the pull-up resistors RI. As a result, power consumption increases during access periods. As another method to stabilize a bus potential during a non-access period, pull-down resistors can be connected between the bidirectional bus and ground to fix a bus potential at 0v. In this case, however, currents flows away through the pull-down resistors to ground during an access period where the bus potential is high, and therefore power consumption increases as in the conventional method that uses pull-up resistors.

SUMMARY OF THE INVENTION

An object of the present invention is to provide a master device and a bus system that can stabilize the bus potential during non-access periods without increasing power consumption during access periods.

The above object can be achieved by a master device that includes a bus and at least one device, wherein the bus connects the master device with the device, the master device including: a first storing unit for storing data to be written into a device; a second storing unit for storing dummy data that stabilizes an electrical potential of the bus; a first management unit for managing whether the system is in an access state in which the master device permits an access to or from one device or a non-access state in which the master device permits an access to or from none of devices; an output selecting unit for outputting, if the system is in the access state and data is to be written into a device, the data in the first storing unit, and for outputting the dummy data in the second storing unit it the system is in the non-access state; and a driving unit for driving, if the output selecting unit outputs one of the data and the dummy data, the bus with a predetermined current to have the bus transfer the one of the data and the dummy data.

With the stated construction, the output selecting unit of the master device selectively outputs dummy data stored in the second storing unit during a non-access period so that the bus potential during this period can be stabilized. As a result, the system of the present invention does not require the pull-resistors that have been used in a conventional bus system. With this conventional bus system, which raises the bus potential during both an access period and a non-access period using the pull-up resistors, currents flow away through the pull-up resistors during an access period where the bus potential is low, while with the present system, there is no possibility of losing currents during this period, and therefore less electricity is used.

Here, the second storing unit may include a latch unit for latching data as the dummy data, the data having been outputted most recently by the first storing unit via the output selecting unit to the input terminal.

For the stated construction, the master device outputs data that the access data storing unit outputted during the latest write enable period as dummy data during a non-access period that immediately follows the write enable period. As a result, the bus potential will not change at a transition from this write enable period to the following non-access period, and therefore the master device uses even less electricity.

Here, the master device may include a separating unit for separating, from data on the bus, data read from a device most recently when the system is in the read enable state, wherein the second storing unit may include a latch unit for latching the separated read data as the dummy data For the stated construction, the master device outputs data that the latch unit latched during the latest read enable period as dummy data during a non-access period that immediately follows the read enable period. As a result, the bus potential will not change at a transition from this read enable period to the following non-access period, and therefore the master device uses less electricity.

BRIEF DESCRIPTION OF THE DRAWINGS

These and the other objects, advantages and features of the invention will become apparent from the following description thereof taken in conjunction with the accompanying drawings which illustrate a specific embodiment of the invention In the drawings.

DESCRIPTION OF THE PREFERRED EMBODIMENTS

The following describes a master device of the present invention with reference to figures, In these embodiments, the master device is provided in a set-top box.

First Embodiment

Figure 1A:
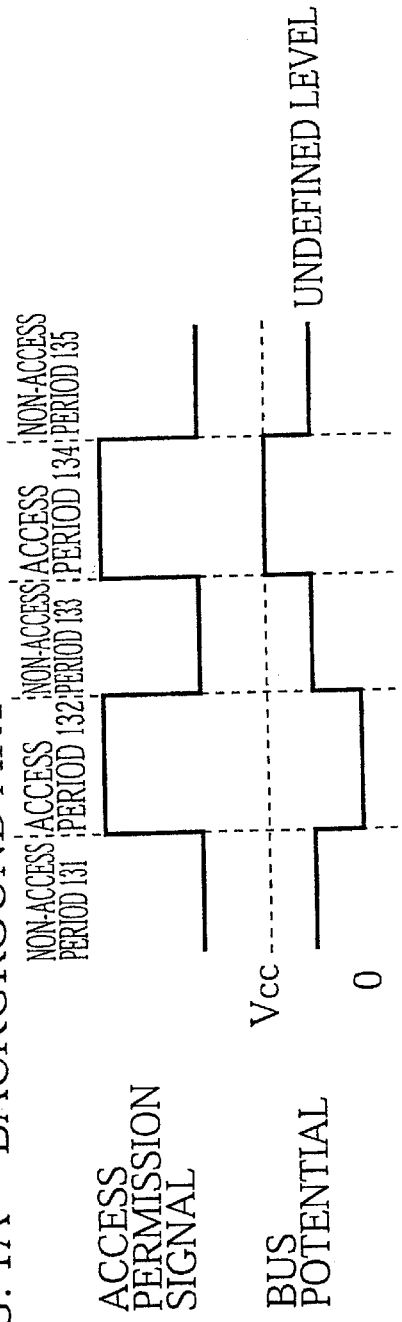
FIG. 1A is a timing chart showing the bus potential is undefined during non-access periods.
Figure 1B:
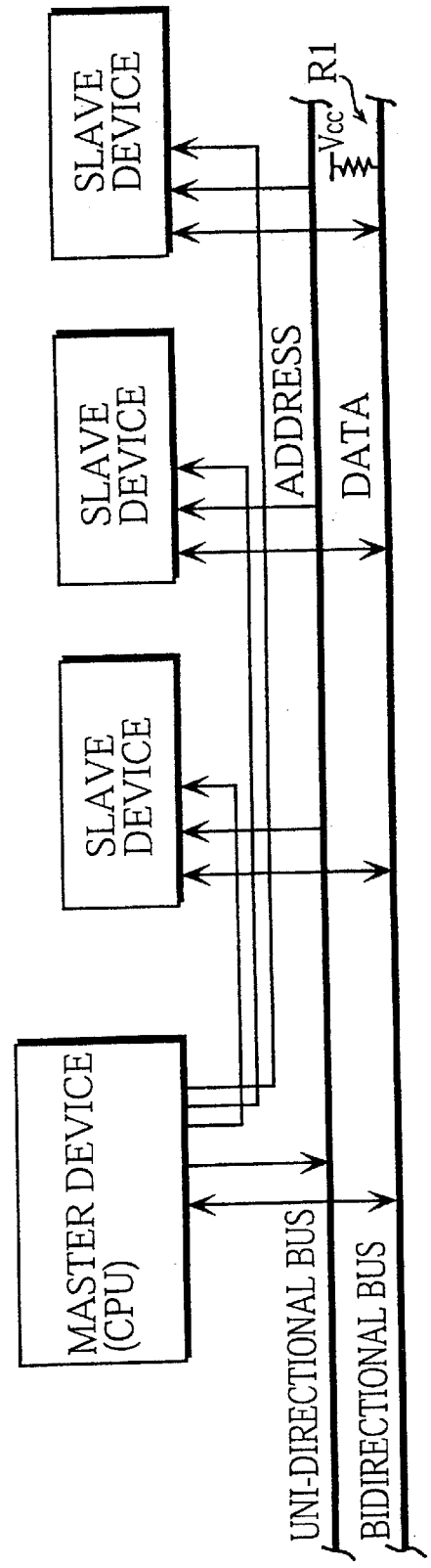
FIG. 1B shows the construction of a bus system in which a CPU and three devices are connected to a uni-directional bus and a bidirectional bus, with which the bus potential during non-access periods can be stabilized.
Figure 1C:
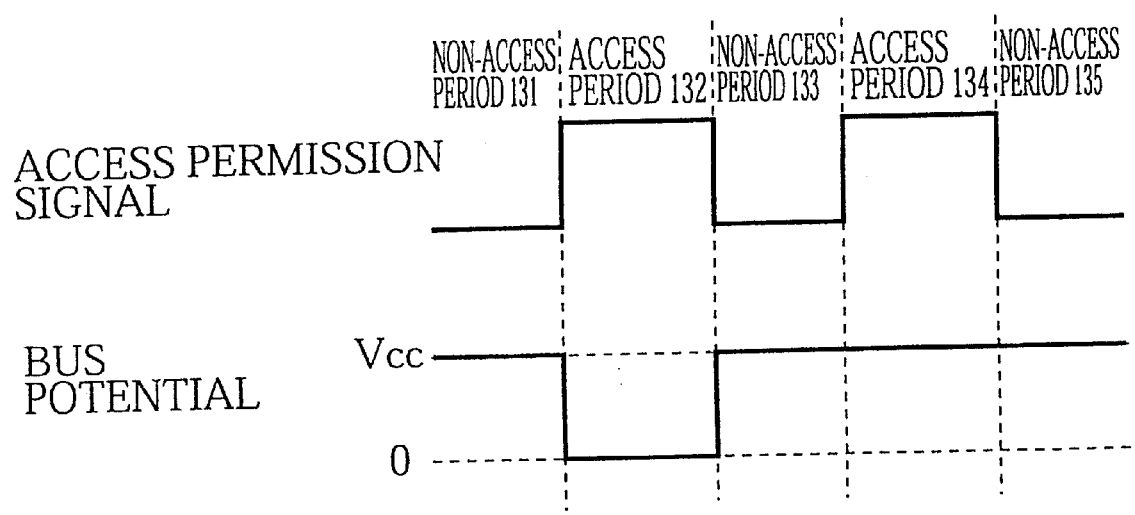
FIG. 1C is a timing chart showing changes in the bus potential for a bus system when pull-up resistors R1 are connected to its bidirectional bus and uni-directional bus.
Figure 2A:
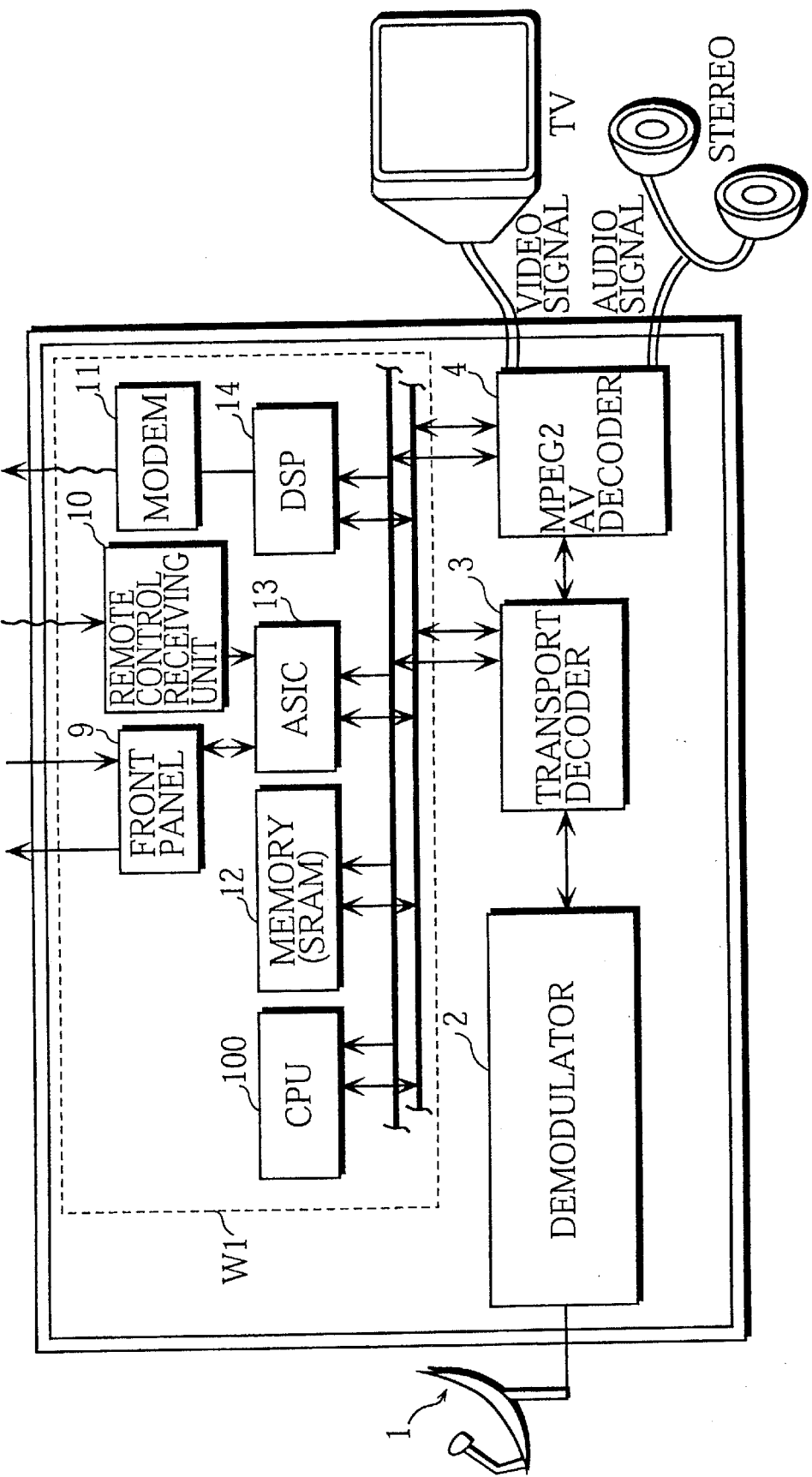
FIG. 2A shows the internal structure of a set-top box for the first embodiment.

FIG. 2A shows an internal structure of the set-top box. The set-top box receives a broadcast wave transferred from a ground station, or via a broadcast satellite or a cable, separates a transport stream contained in the broadcast wave into video streams, audio streams, or the like, decodes these streams into video signals, audio signals, or the like, and outputs the resulting signals. The set-top box is usually used with a TV or a personal computer in the home.

Figure 2B:
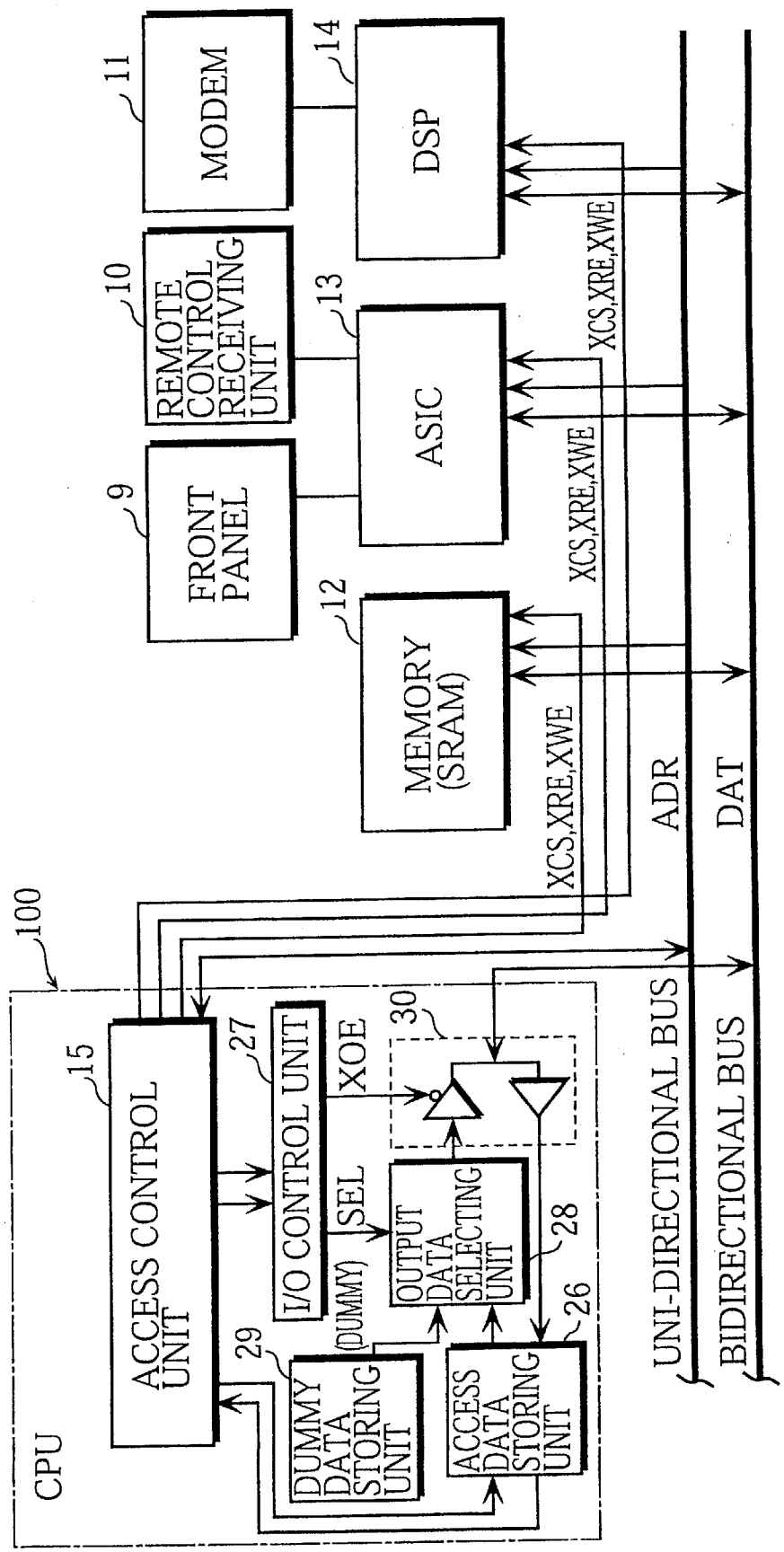
FIG. 2B shows a bus system corresponding to a part enclosed by box w1 in FIG. 2A.

As shown in the figure, the set-top box comprises a demodulator 2, a transport decoder 3, an AV decoder 4, a front panel 9, a remote control receiving unit 10, a modem 11, a memory 12, an application specific IC (ASIC) 13, a digital signal processor (DSP) 14, and a CPU 100. The demodulator 2 demodulates a broadcast wave received by a satellite broadcast antenna 1 to obtain MPEG2 transport streams, and the transport decoder 3 separates an MPEG2 video streams and an MPEG2 audio streams from the MPEG2 transport stream. The AV decoder 4 then decodes the MPEG2 video stream and the MPEG2 audio stream into video signals and audio signals. Of these components, components constituting a bus system are enclosed by a dotted box w1. FIG. 2B shows a detailed structure of the bus system. In this bus system, the CPU 100, having a high processing speed, is the sole master device, and the memory 12, the ASIC 13, and the DSP 14 are slave devices. The following explains the master device and the slave devices in this bus system with reference to FIG. 2B.

The memory 12 is a static RAM (SRAM) or the like and stores data such as data to be displayed on the TV monitor during reception of a broadcast wave or data displayed in response to a user's remote-control operation.

The ASIC 13 receives an operation made by a user by pressing a button on the front panel 9, displays a time or channel numbers on the front panel 9, and controls the reception of remote control signals by the remote control receiving unit 10.

The DSP 14 is connected to a communication line via the modem 11 and receives and transmits bill information.

Figure 3:
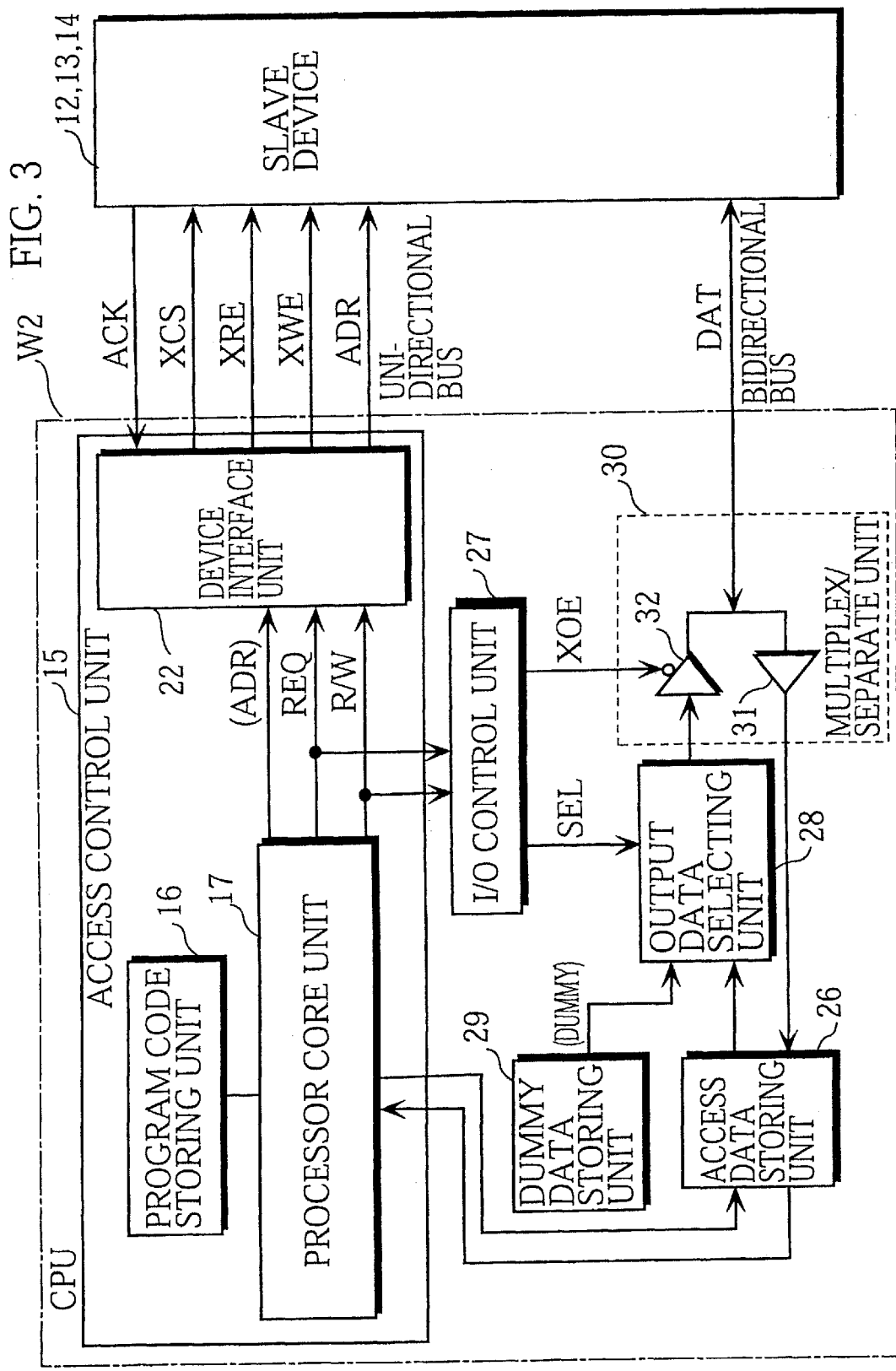
FIG. 3 shows an internal construction of CPU 100.

The CPU 100 controls the overall bus system and includes the components shown in FIG. 3. As shown in FIG. 2B, the CPU 100 transmits a chip select signal (shown by "XCS" in the figure), a read-enable signal ("XRE"), and a write-enable signal ("XWE") to a slave device, and inputs and outputs data ("DAT"), and outputs an address ("ADR"). Note that when a target slave device is a ROM or a RAM that is realized by a plurality of chips, a master device may need to transmit an XCS signal to each chip in some cases, although in the present embodiment it is assured that the CPU 100 needs to transmit only one XCS signal to a target slave device for one access.

The following explains the internal structure of the CPU 100 with reference to FIG. 3. Although the bus system shown in FIGS. 2A and 2B includes three slave devices, the memory 12, the DSP 14, and the ASIC 13, FIG. 3 shows only one slave device to simplify the connections of the unidirectional bus, the bidirectional bus, and other lines.

The components enclosed in box w2 are packaged in a chip of the CPU 100. As the inside of CPU 100 chip is not affected by external noise, operating voltages inside the CPU 100 are from 0V to 2.5V, whereas operating voltages outside the CPU 100 are from 0v to 3.3V as the outside is subject to such noise. Accordingly, circuits outside of the CPU 100 are driven with relatively large currents, while circuits packaged inside the CPU 100 are constructed by circuit elements with high impedance and driven with tiny currents. In this way, the processing inside the CPU 100 uses low operating voltages and tiny currents.

As shown in FIG. 3, the CPU 100 includes an access control unit 15, an access data storing unit 26, an input/output (I/O) control unit 27, an output data selecting unit 28, a dummy data storing unit 29, and a multiplex/separate unit 30. The access control unit 15 contains a program code storing unit 16, a processor core unit 17, and a device interface unit 22, and the multiplex/separate unit 30 contains drivers 31 and 32.

The access control unit 15 controls access to the memory 12, the ASIC 15, and the DSP 14 by transmitting an XCS signal, an XWE signal, and an XRE signal. The access control unit 15 uses different access periods for different slave devices, since each slave device has a different timing to input these signals and an address. An access period for one slave device is always the same.

Figure 6:
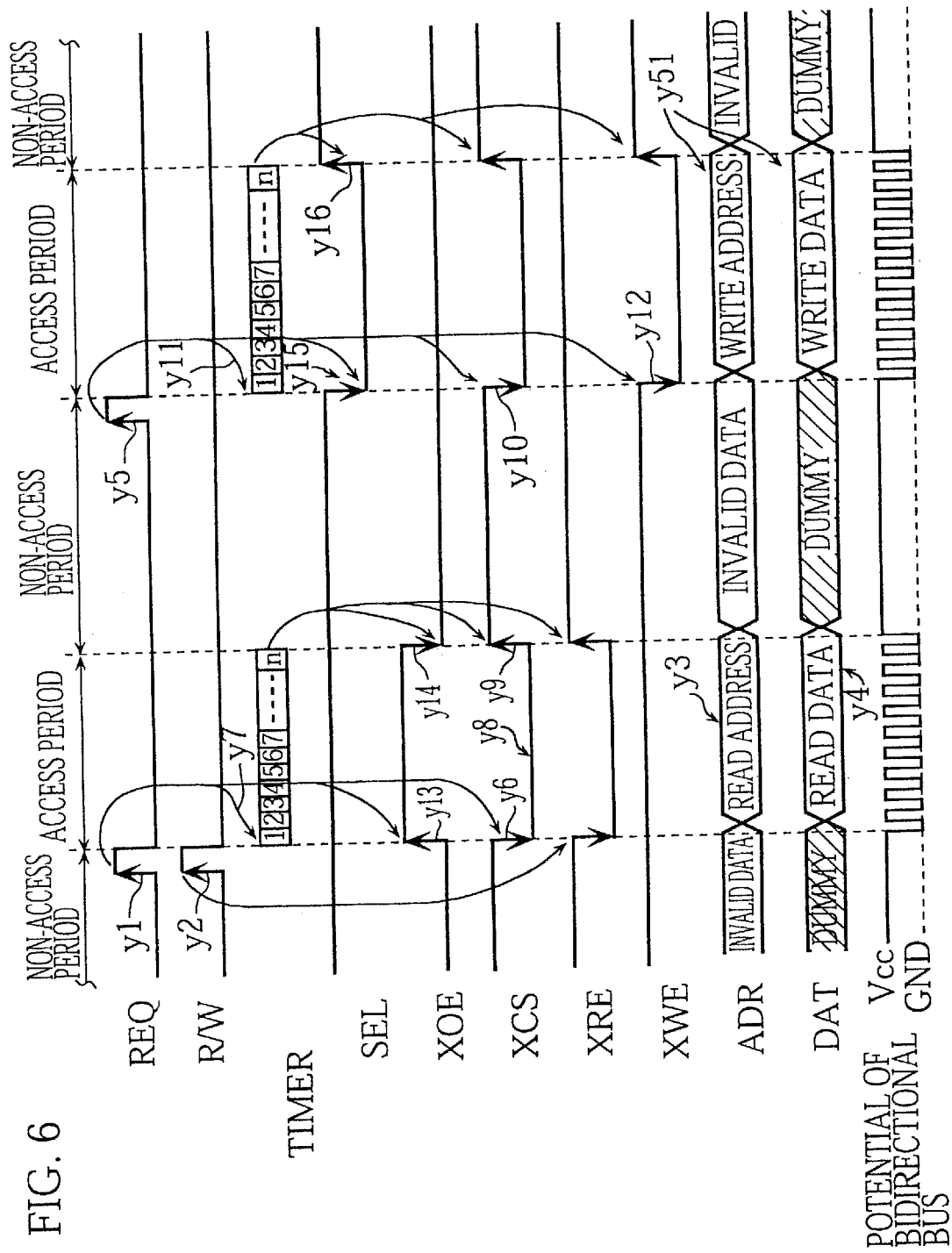
FIG. 6 is a chart showing timing of outputting a REQ signal, a R/W signal, a SEL signal, an XOE signal, an XCS signal, an XRE signal, an XWE signal, and addresses, and of inputting/outputting data.

FIG. 6 is a chart showing timing of outputting a request signal (indicated as "REQ" in the chart), a read/write signal ("R/W")T, a select signal ("SEL"), an output enable signal ("XOE"), an XCS signal, an XRE signal, an XWE signal, addresses ("ADR"), and of inputting/outputting data ("DAT"). The timing of "ADR" is for outputting an address onto the uni-directional bus, and the timing of "DAT" is for inputting/outputting data onto the bidirectional bus. Hereafter, this timing chart is referred to when the components of the CPU 100 are explained. The REQ signal is active when it is shown as high in the chart, and the XOE signal, the XCS signal, the XRE signal, and the XRE signal are active when they are low. When the R/W signal is high, the signal indicates that data is to be read from a slave device, and when the signal is low, it indicates that data is to be written into a slave device. When the SEL signal is high, the signal indicates that the dummy data storing unit 29 is to output data, and when the signal is low, it indicates that the access data storing unit 26 is to output data.

The program code storing unit 16 stores program code relating to user interface used by the set-top box.

Figure 4:
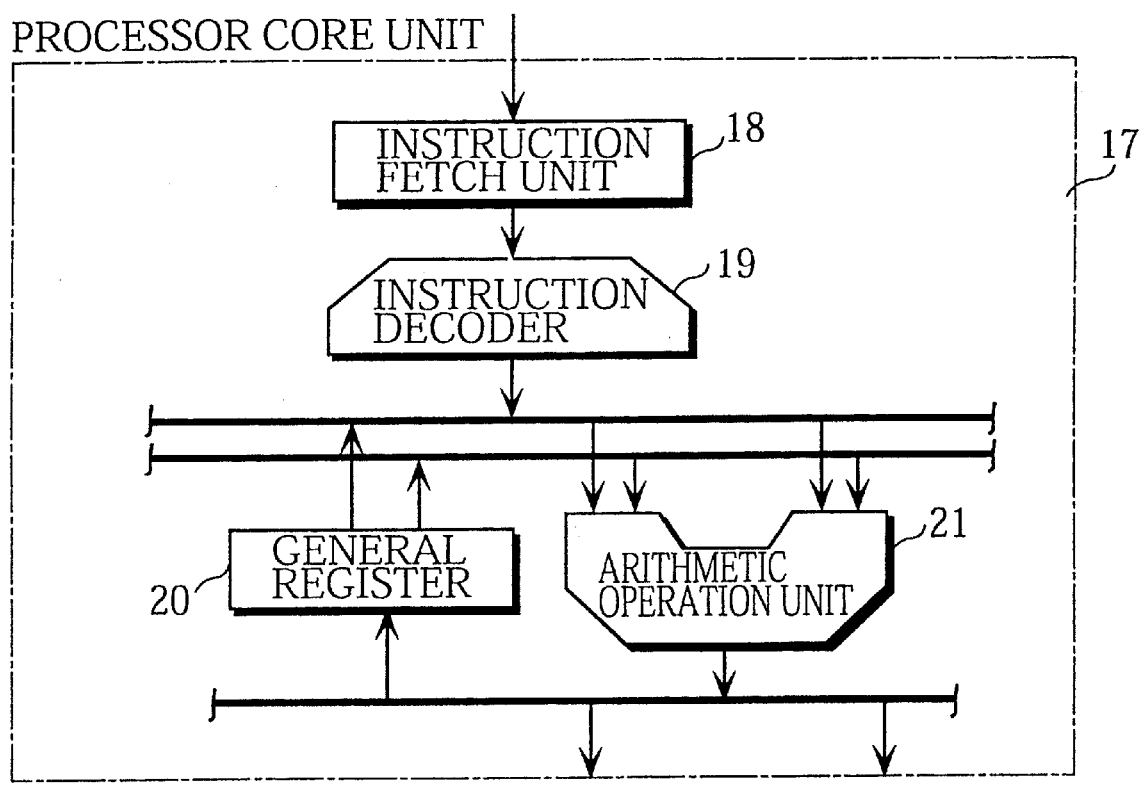
FIG. 4 shows an internal construction of processor core unit 17.

As shown in FIG. 4, the processor core unit 17 includes an instruction fetch unit 18 for fetching an instruction from the program code storing unit 16, an instruction decoder 19 for decoding the fetched instruction, an arithmetic operation unit 21 for performing operations based on the decoded instruction, and a general register 20 that stores values used for the operations of the arithmetic operation unit 21. The processor core unit 17 outputs the REQ signal and the R/W signal to the device interface unit 22. The following explains output timing of these signals and the resulting processing with reference to the timing chart of FIG- 6.

When data needs to be read from one of the slave devices, the processor core unit 17 raises the REQ signal and the R/W signal as indicated by arrows "y1" and "y2" in the chart, The high REQ signal indicates that an access to a slave device is required, and the high R/W signal indicates that the access is for a read. In response to these signals, the address (represented by "READ ADDRESS" in the chart) of the data to be read is outputted onto the uni-directional bus as indicated by arrow "y3". The data (represented by "READ DATA") is then read from the slave device via the bidirectional bus as shown by arrow "y4" and transferred via the multiplex/separate unit 30 and the access data storing unit 26 to the processor core unit 17. On the other hand, when data needs to be written into a slave device, the processor core unit 17 raises the REQ signal as indicated by arrow "y5", while leaving the R/W signal low to indicate that the access requested by the REQ signal is for a write. As a result, the address (represented by "WRITE ADDRESS" in the chart) of the location into which data is to be written is outputted onto the uni-directional bus, and the data ("WRITE DATA") to be written is outputted onto the bidirectional bus, as indicated by arrow "y51".

Figure 5:
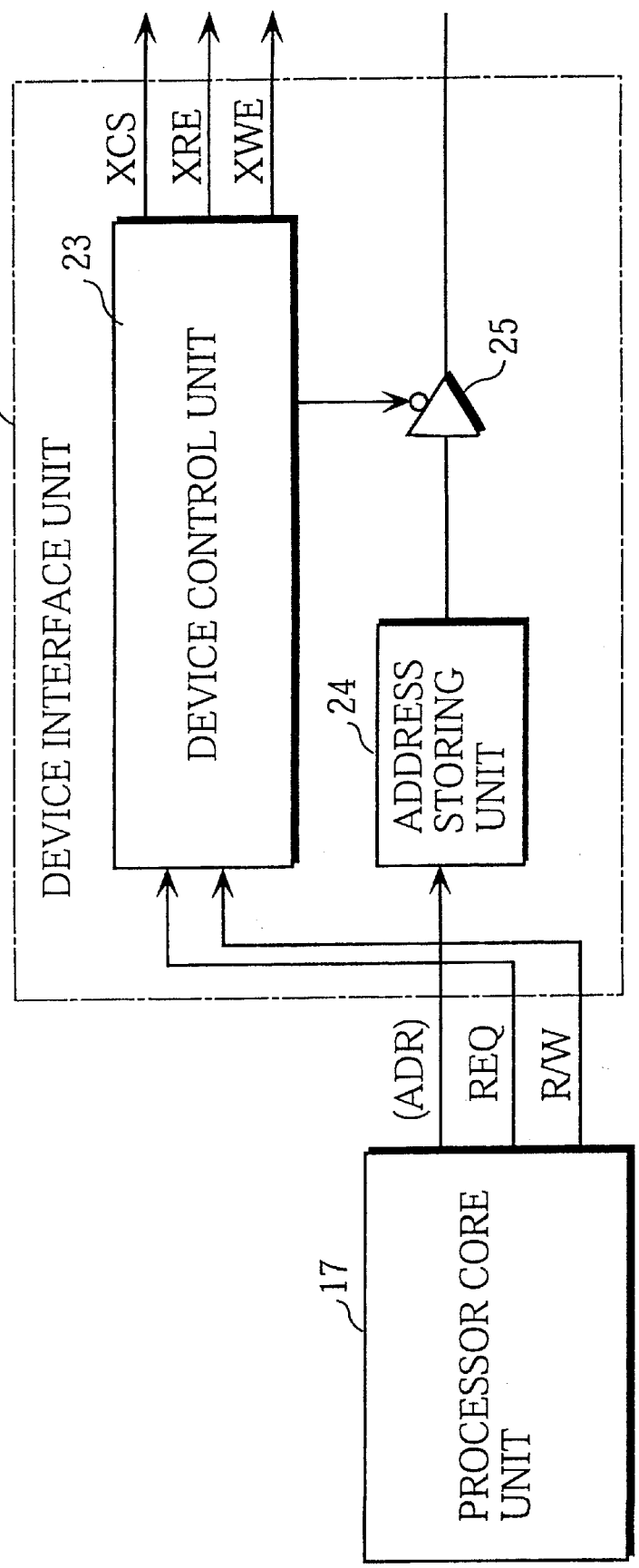
FIG. 5 shows an internal construction of device interface unit 22.

The device interface unit 22 includes a device control unit 23, an address storing unit 24, and a driver 25 as shown in FIG. 5. The device control unit 23 controls a slave device based on the REQ signal and the R/W signal outputted by the processor core unit 17, and the address storing unit 24 stores an address outputted from the processor core unit 17. The driver 25 drives the uni-directional bus with a predetermined current so that the address outputted from the address storing unit 24 is carried onto the uni-directional bus.

According to the REQ signal, the R/W signal, and the address transmitted from the processor core unit 17, the device control unit 23 outputs the XCS signal, the XRE signal, and the XWE signal to a target slave device. The following explains the outputting of these signals by the device control unit 23 with reference to the timing chart of FIG. 6. The device control unit 23 sets the XCS signal, the XRE signal, and the XWE signal at high as their normal state. On receiving the REQ signal and the R/W signal raised as indicated by arrows "y1" and "y2" in the chart and the address from the processor core unit 17, the device control unit 23 detects a target slave device by referring to the outputted address, and lowers the XRE signal and the XCS signal for the detected slave device as indicated by arrow "y6". On receiving the high REQ signal, the device control unit 23 also starts counting from "1" to "n" as indicated by arrow "y7" for a predetermined period, which is an access period specific to the target slave device, using a built-in timer. When the timer has counted to the predetermined period, the device control unit 23 raises the XRE signal and the XCS signal, as indicated by arrow "y9".

When the REQ signal is raised as indicated by arrow "y5" and the R/W signal remains low, which indicates that a writing into a slave device is requested, the device control unit 23 lowers the XCS signal as indicated by arrow "y10", in the same way as when it lowers the XCS signal as indicated by arrow "y6". On receiving the high REQ signal, the device control unit 23 starts counting a predetermined period as indicated by arrow "y11" and at the same time lowers the XWE signal low as shown by arrow "y12" to indicate that a write is requested. The device control unit 23 raises the XCS signal and the XWE signal after counting for the predetermined access period. Although the device control unit 23 counts each access period using its own timer in the present embodiment, an access period may be set as the period until when an acknowledge signal is transferred to the access control unit 15 to inform the master device that the access to a slave device has been completed.

The access data storing unit 26 includes a buffer to store data that has been read from or is to be written into a slave device.

The I/O control unit 27 inputs the REQ signal and the R/W signal outputted from the processor core unit 17 and outputs the XOE signal and the SEL signal to the driver 32 and the output data selecting unit 28 respectively according to the inputted REQ signal and R/W signal. On receiving the REQ signal and the R/W signal that has been raised by the processor core unit 17 as indicated by arrows "y1" and "y2", the I/O control unit 27 raises the XOE signal as indicated by arrow "y13" and keeps it high daring the access period. When the access has been completed, the I/O control unit 27 lowers the XOE signal as indicated by arrow "y14". On the other hand, on receiving the REQ signal raised as indicated by arrow "y5" and the R/W signal that has been left low, the I/O control unit 27 lowers the SEL signal as indicated by arrow "y15" and keeps it low during the access period. When the access has been completed, the I/O control unit 27 raises the SEL signal as indicated by arrow "y16".

The output data selecting unit 28 has three input terminals connected to the access data storing unit 26, the dummy data storing unit 29, and the I/O control unit 27, and one output terminal connected to the driver 32. During an access period for a write (a write enable period), the output data selecting unit 28 inputs data from the access data storing unit 26 and outputs the data to the input terminal of the driver 32 in the multiplex/separate unit 30. During a non-access period and an access period for a read, the output data selecting unit 28 selectively outputs dummy data stored in the dummy data storing unit 29 to the input terminal of the driver 32. Here, the output data selecting unit 28 selects input data based on the SEL signal transmitted from the I/O control unit 27. This is to say, during the access period between arrows "y15" and "y16", where the inputted SEL signal is low, the output data selecting unit 28 selectively inputs data from the access data storing unit 26 and outputs the data to the input terminal of the driver 32 in the multiplex/separate unit 30. When the SEL signal is high (i.e., a non-access period or an access period for a read during which the XRE signal is low), the output data selecting unit 28 inputs dummy data from the dummy data storing unit 26 and outputs the dummy data to the input terminal of the driver 32.

The dummy data storing unit 29 stores dummy data to be outputted onto the bidirectional bus during a non-access period. In the conventional method described earlier, pull-up resistors are connected to the bidirectional bus outside of the CPU to raise the bus potential, and the potential of conductors constituting the bidirectional bus needs to be maintained at 3.3V. With the present embodiment, however, since the dummy data storing unit 29 is packaged in the CPU 100 and stores dummy data by electric charges and discharges, dummy data can be stored with reduced power consumption. Here, it is favorable that the dummy data is a bit sequence whose bits are all "1" or "0" to minimize the circuit size of the dummy data storing unit 29.

The multiplex/separate unit 30, which includes the drivers 31 and 32 that are connected to the bidirectional bus, obtains data that has been read from a slave device from data on the bidirectional bus, and transfers data to he written into a slave device onto the bidirectional bus.

The driver 31 has an output terminal and an input terminal. The driver 31 inputs data from the input terminal connected to the bidirectional bus and outputs the inputted data to the access data storing unit 26 connected to the output terminal.

The driver 32 has an enable terminal for receiving the XOE signal, an input terminal connected to the output data selecting unit 28, and an output terminal connected to the bidirectional bus. When the enable terminal receives a low XOE signal, the driver 32 drives the bidirectional bus with a predetermined current so that data inputted via the input terminal is transferred onto the bidirectional bus. The XOE signal is set low unless the XRE signal is low (active), that is, the XOE signal is low during a non-access period and an access period in which the XWE signal is low (active). Accordingly, the driver 32 drives the bidirectional bus during a non-access period as well as an access period for a write. During a non-access period, the output data selecting unit 28 selects dummy data to output to the driver 32, therefore the driver 32 receives dummy data and outputs it onto the bidirectional bus during this period. In this way, as dummy data is continuously transferred onto the bidirectional bus during a non-access period, a potential of the bidirectional bus during this period can be stabilized.

As has been described, the output data selecting unit 28 outputs dummy data to stabilize a bus potential during a non-access period, and therefore pull-up resistors that are conventionally used in a bus system are no longer necessary. More specifically, the output data selecting unit 28 outputs dummy data stored in the dummy data storing unit 29 to the input terminal of the driver 32 during a non-access period. As the pull-up resistors are not used in the present bus system, there is no possibility of losing a current via the pull-up resistors during an access period in which the bus potential is low, and therefore power consumption can be reduced with the present bus system.

Note that although the output data selecting unit 28 outputs dummy data during an access period in which the XRE signal is low in the present embodiment, the output data selecting unit 28 does not have to do so.

Second Embodiment

The second embodiment is basically the same as the first embodiment, although the dummy data storing unit 29 includes a latch circuit in the second embodiment. This latch circuit latches data outputted by the access data storing unit 26 to be written into a slave device so that the latched data is outputted again onto the bidirectional bus as dummy data during a non-access period.

Figure 7:
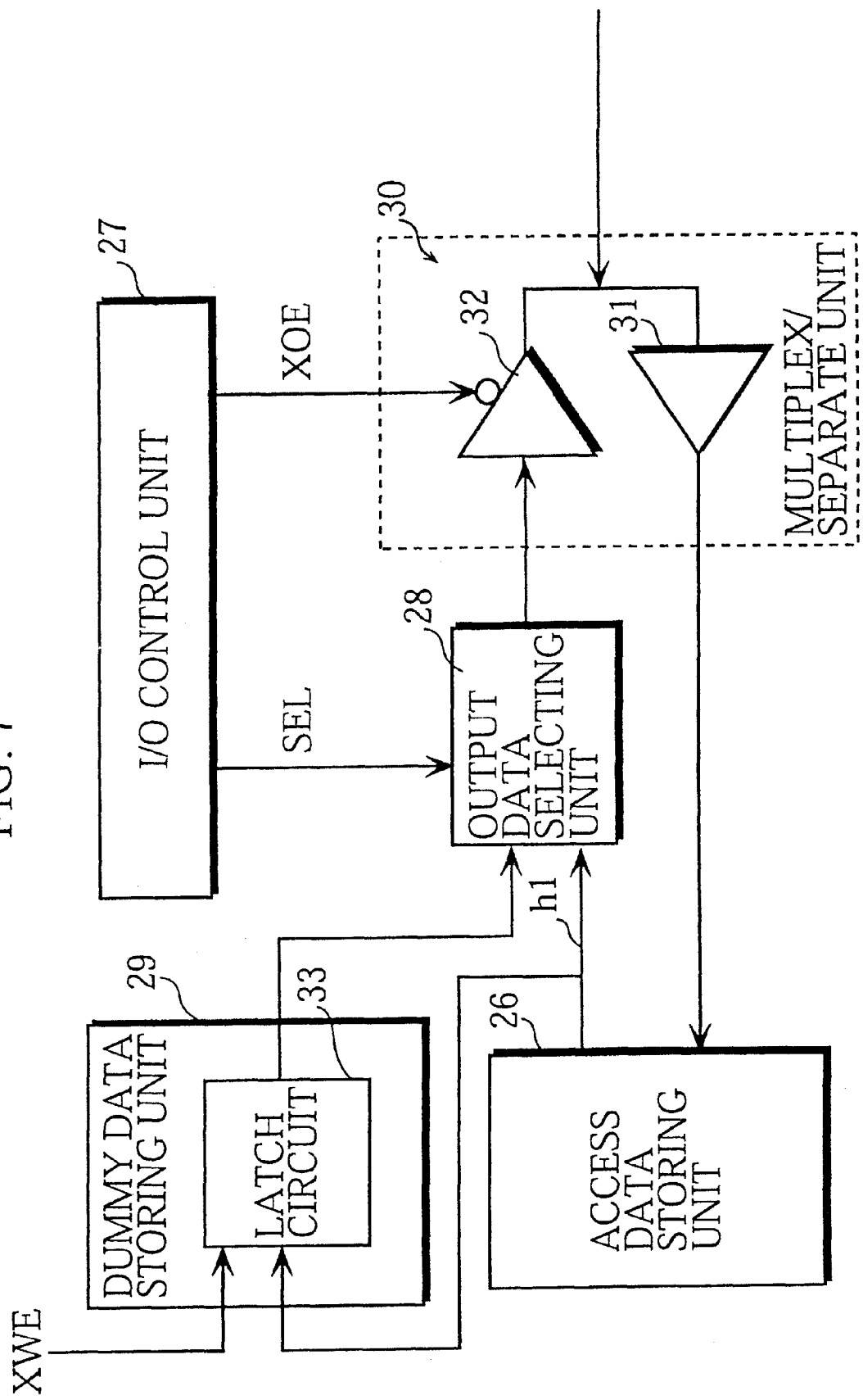
FIG. 7 shows latch circuit 33 and its connections to other units in the second embodiment.

FIG. 7 shows the latch circuit 33 and its connections to other units. The latch circuit 33 is connected to a line h1 that connects the access data storing unit 26 with the output data selecting unit 28, and latches data on the line hi starting from when the XWE signal is lowered.

If it is clear that the access data storing unit 26 is still storing data that it outputted during the latest write enable period or received during the latest read enable period, the access data storing unit 26 may output the stored data as dummy data during a non-access period onto the bidirectional bus to stabilize a bus potential. In reality, however, such data in the access data storing unit 26 can be overwritten by the processor core unit 17 during a non-access period and so is not suited to output as dummy data. Accordingly, the dummy data storing unit 29 of the present embodiment includes the latch circuit 33 for latching data that the access data storing unit 26 outputted during the most recent write enable period so that the data is outputted onto the bidirectional bus as dummy data during a non-access period.

Figure 8:
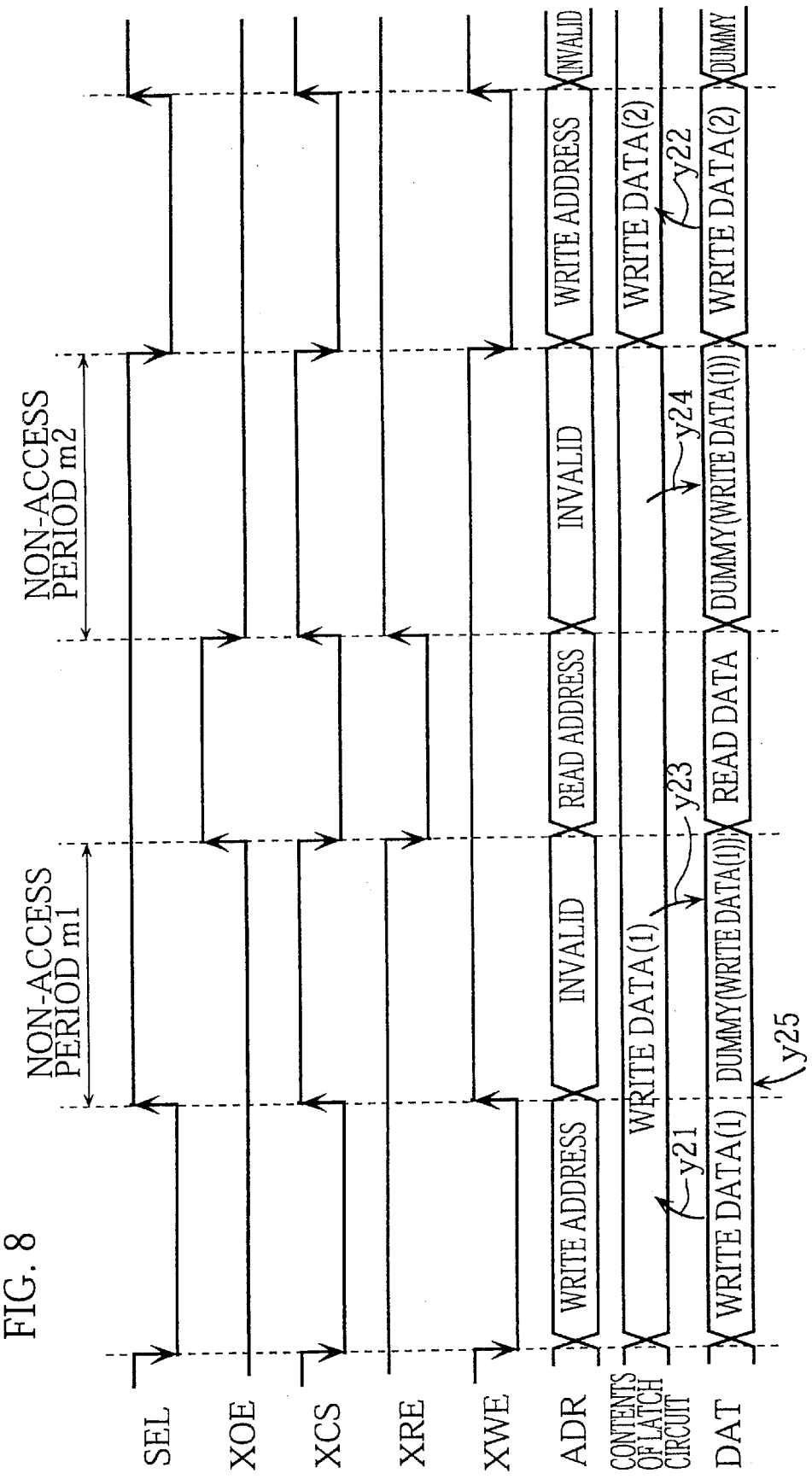
FIG. 8 is a chart showing timing of: driving a bidirectional by the latch circuit 33; outputting signals and addresses; and inputting/outputting data.

FIG. 8 is a chart showing timing of: driving the bidirectional by the latch circuit 33; outputting signals and addresses; and inputting/outputting data. The chart shows the same kinds of signals as FIG. 6 although FIG. 8 omits the REQ signal and the R/W signal. The stored contents of the latch circuit 33 is shown between the timing of "ADR" and "DAT". The latch circuit 33 latches "WRITE DATA(1)" and "WRITE DATA(2)" with the timing indicated by arrows y21 and y22. The latched "WRITE DATA(1)" is then outputted onto the bidirectional bus as shown by arrows y23 and y24 during non-access periods m1 and m2. In this way, since the "WRITE DATA (1)" is outputted onto the bidirectional bus during two consecutive periods of the write enable period and the following non-access period, the bus potential will not change at the transition indicated by arrow y25 from the write enable period to the non-access period. Accordingly, the bus system of the second embodiment uses even less electricity than the first embodiment.

Note that if it is clear that the buffer in the access data storing unit 26 is still storing the data that was outputted-during the latest write enable period, then the data in the buffer may be outputted as dummy data during a non-access period so that the same bus potential can be maintained during the above transition. If so, the dummy data storing unit 29 does not need the latch circuit 33.

Third Embodiment

In the third embodiment, the latch circuit 33 of the second embodiment is connected to a line h2 connecting the access data storing unit 26 with the driver 31, and latches data transferred on this line h2.

Figure 9:
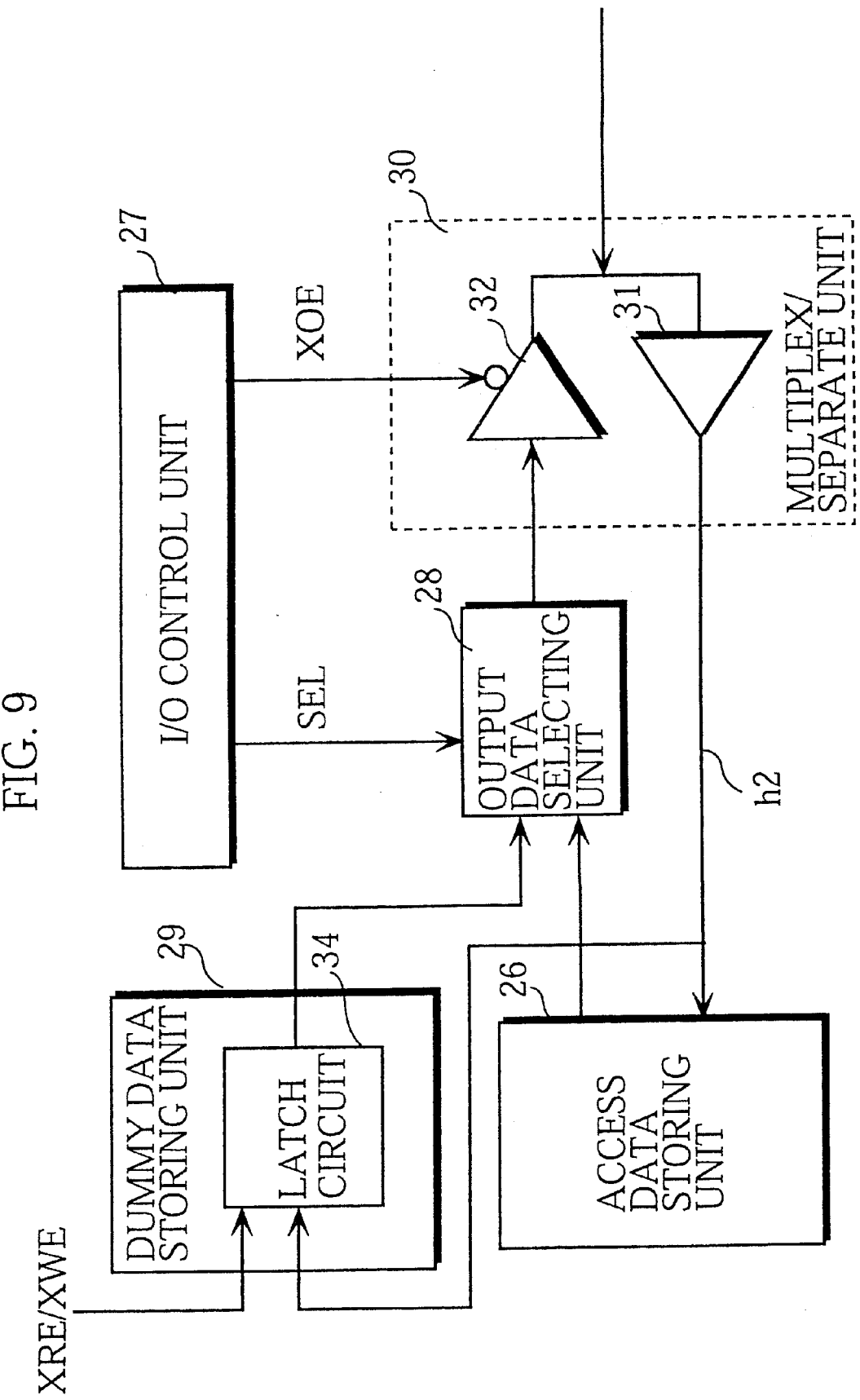
FIG. 9 shows latch circuit 34 and its connections to other units in the third embodiment.

FIG. 9 shows the latch circuit 34 and its connections to other units. The latch circuit 34 latches data on the line h2 when the XWE or XRE signal is low. The output data selecting unit 28 selectively outputs dummy data in the dummy data storing unit 29 to the driver 32 during a non-access period and a read enable period, and the driver 32 outputs the dummy data onto the bidirectional bus during a non-access period. During a write enable period, the output data selecting unit 28 selectively outputs data stored in the access data storing unit 26.

During a read enable period, data is read from a slave device and transferred onto the bidirectional bus, the driver 31, and the line h2. The latch circuit 34 latches the data transferred on the line h2. During a write enable period, data to be written into a target slave device is outputted to the driver 31 as well as the bidirectional bus. The driver 31 then outputs the data onto the line h2 so that the latch circuit 34 latches this data.

Figure 10:
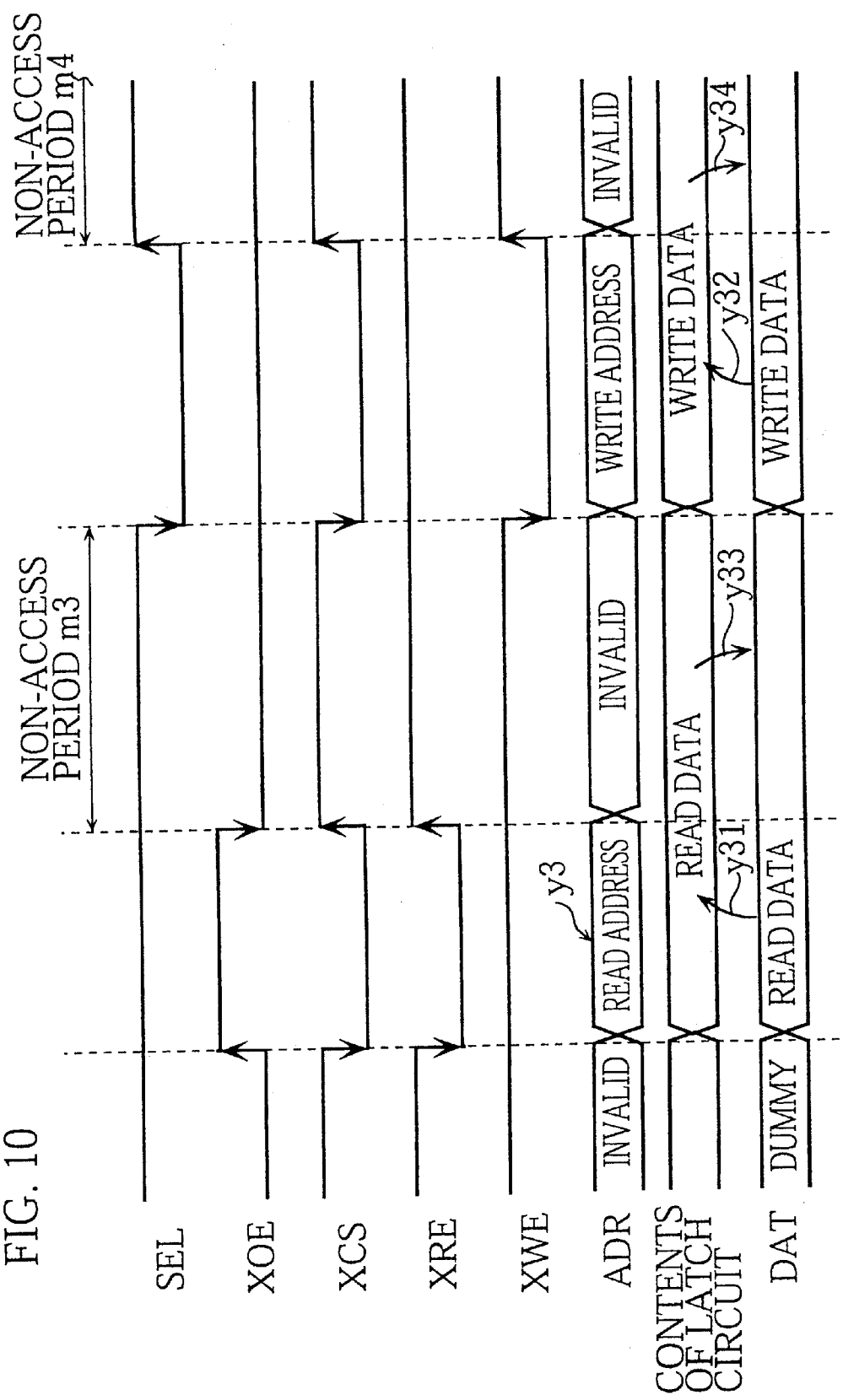
FIG. 10 is a chart showing timing of: driving a bidirectional by the latch circuit 34; outputting signals and addresses; and inputting/outputting data.

FIG. 10 is a chart showing timing of: driving the bidirectional by the latch circuit 34; outputting signals and addresses; and inputting/outputting data. The chart shows the same kinds of signals as FIG. 8. The stored contents of the latch circuit 34 are shown between the timing of "ADR" and "DAT". The latch circuit 34 latches "READ DATA" and "WRITE DATA" with the timing indicated by arrows y31 and y32. The latched "READ DATA" and "WRITE DATA" is then outputted as dummy data onto the bidirectional bus as shown by arrows y33 and y34 during non-access periods m3 and m4. In this way, since the same "WRITE DATA" or "READ DATA" is outputted onto the bidirectional bus during an access period and the immediately following non-access period, a bus potential will not change during these adjacent periods, and power consumption can be reduced.

As has been described, with the present embodiment, the latch circuit 34 latches data during both a read enable period and a write enable period, and the latched data is outputted onto the bidirectional bus during a non-access period that immediately follows. As a result, the bus potential will not change between a read enable period and a non-access period or between a write enable period and a non-access period. Accordingly, the bus system of the third embodiment achieves an even greater reduction in power consumption than the first and second embodiments.

Fourth Embodiment

In the fourth embodiment, the access control unit 15 of the first embodiment is modified so that similar processing to that performed by the output data selecting unit 28 to selectively output dummy data in the dummy data storing unit 29 or data in the access data storing unit 26 can be performed inside the access control unit 15.

Figure 11:
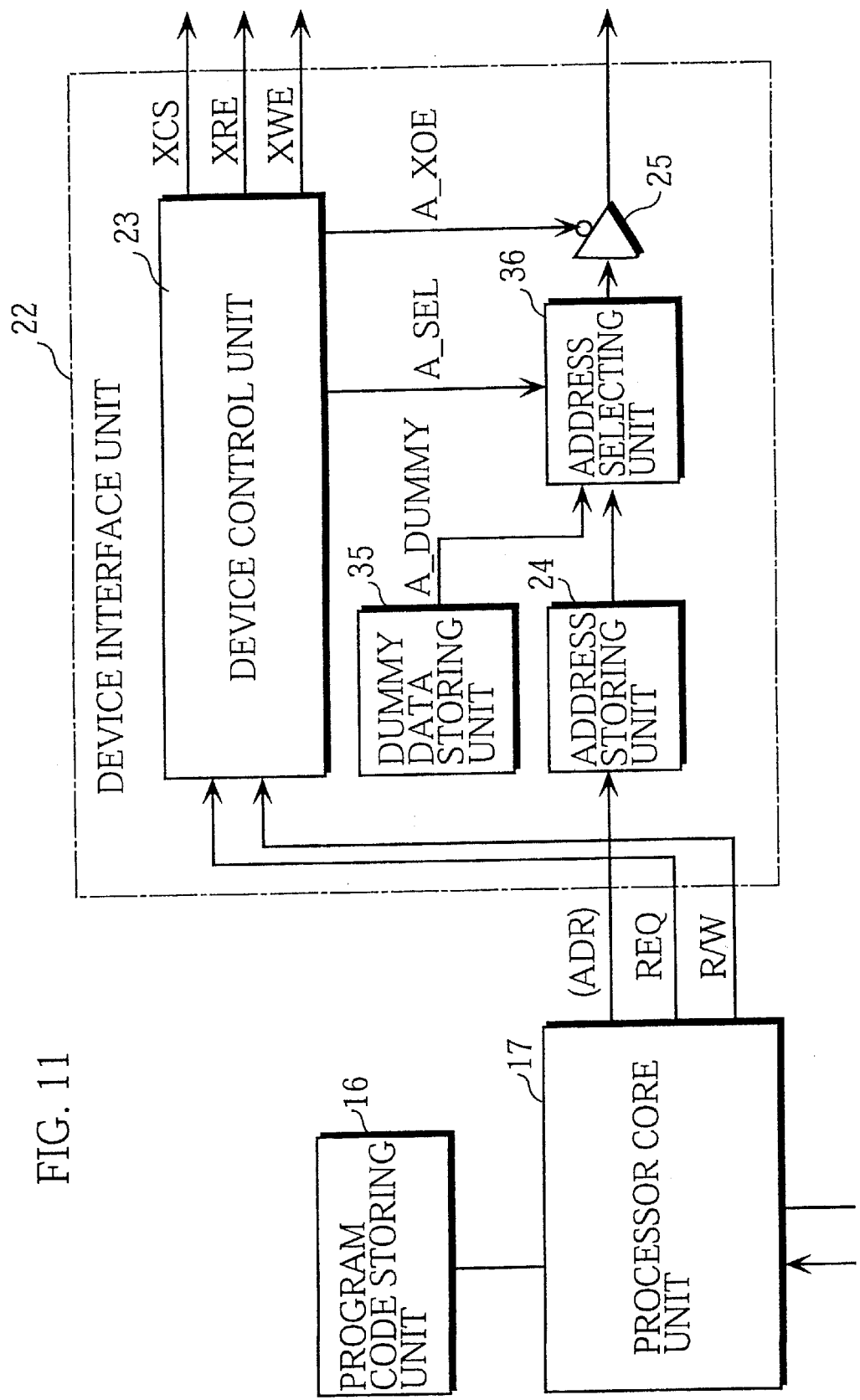
FIG. 11 shows the internal structure of device interface unit 22 in the fourth embodiment.

FIG. 11 shows the internal structure of the device interface unit 22 of the present embodiment. This structure is similar to that shown in FIG. 5, but the device interface unit 22 of the fourth embodiment includes a dummy data storing unit 35 and an address selecting unit 36 that respectively correspond to the dummy data storing unit 29 and the output data selecting unit 28 of the first embodiment. In the first embodiment, dummy data that stabilizes the bus potential of the bidirectional bus is stored in the dummy data storing unit 29 and selected by the output data selecting unit 28. In the present embodiment, dummy data is also stored in the dummy data storing unit 35 and selected by the address selecting unit 36 to stabilize the bus potential of the unidirectional bus. More specifically, the dummy data storing unit 35 stores dummy data "A_DUMMY", and the address selecting unit 36 selectively outputs dummy data "A_DUMMY" or an address stored in the address storing unit 24. With the first embodiment, the output data selecting unit 28 selects either dummy data or data in the access data storing unit 26 according to the SEL signal, while in the present embodiment the address selecting unit 36 selects either an address or dummy data "A_DUMMY" according to an "A_SEL" signal outputted by the device control unit 23. Also for the present embodiment, the device control unit 23 outputs an "A_XOE" signal to the driver 25 when the I/O control unit 27 of the first embodiment outputs the XOE signal to the driver 32.

Figure 12:
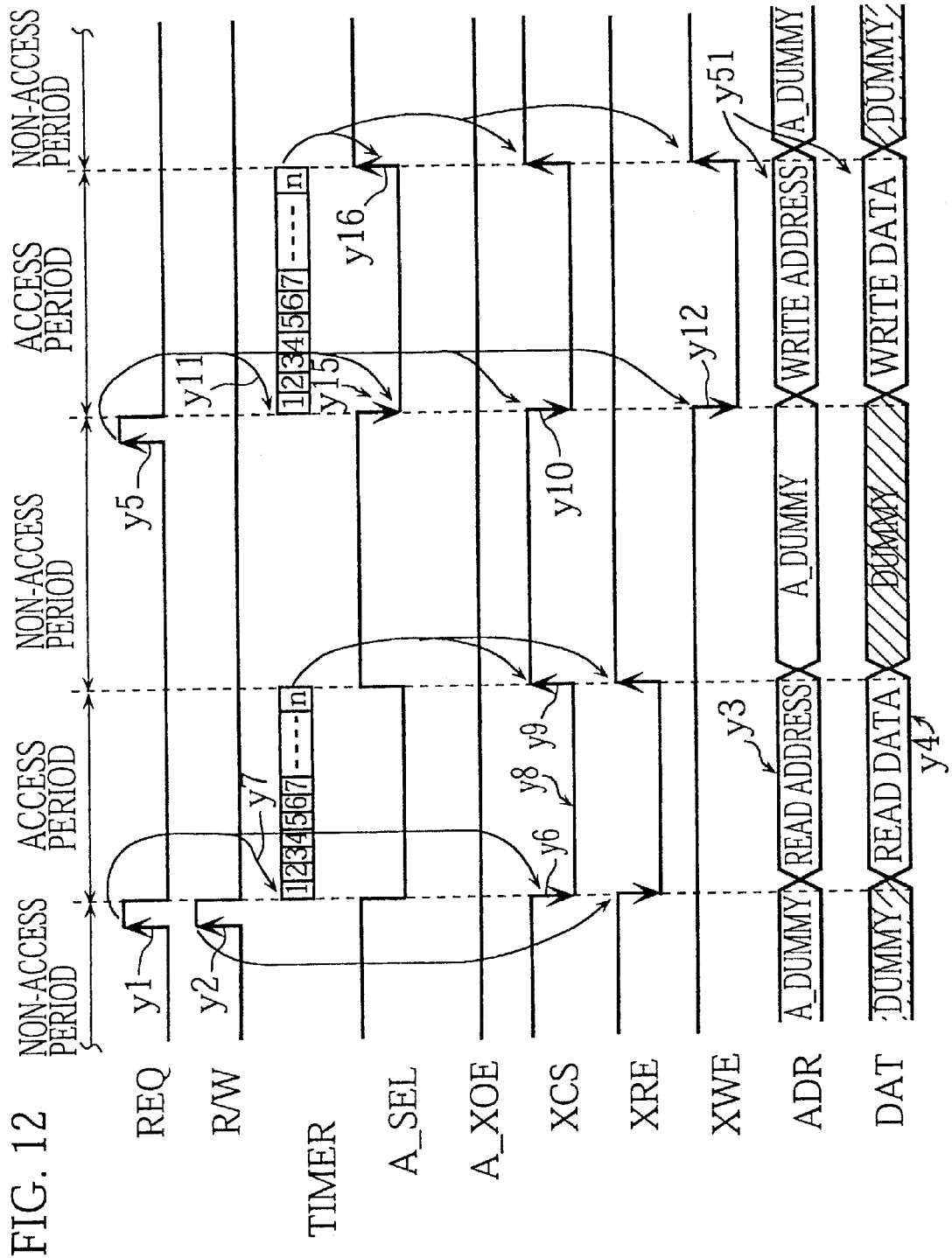
FIG. 12 is a chart showing timing of outputting signals and addresses, and of inputting/outputting data for the fourth embodiment.

FIG. 12 is a chart showing timing of outputting signals and addresses "ADR", and of inputting/outputting data "DAT". As can be seen by comparing this timing chart with the timing chart of FIG. 6 in the first embodiment, FIG. 12 differs from FIG. 6 as follows. First, when the XRE signal is low, the A_SEL signal and the A_XOE signal are low. Second, dummy data "A_DUMMY" is outputted onto the uni-directional bus during non-access periods in FIG. 12 instead of invalid data "INVALID DATA" in FIG. 6. By outputting dummy data during a non-access period in this way, a potential of the unidirectional bus is stabilized in the present embodiment.

As has been described, with the present embodiment, the address selecting unit 36 selectively outputs dummy data stored in the dummy data storing unit 35 instead of an address stored in the address storing unit 24 to the uni-directional bus during a non-access period. As a result, the uni-directional bus will not be affected by a change of addresses stored in the address storing unit 24 during a non-access period, thereby reducing the amount of electricity used during a non-access period.

The present embodiment does not require a driver specifically for the uni-directional bus to be newly provided. The bus potential during a non-access period is therefore stabilized without increasing the circuit size of the bus system.

It is also possible to have the dummy data storing unit 35 contain a latch circuit as described in the second and third embodiments so that an address that has been outputted to a slave device is latched by the dummy data storing unit 35 and is outputted as dummy data to the uni-directional bus during a non-access period.

Fifth Embodiment

With the first to third embodiments, the master device detects a period during which none of the plurality of slave devices in the bus system are accessed as one non-access period. In this fifth embodiment, the master device detects non-access periods for each slave device separately so that power consumption of slave devices during such period can be reduced.

Figure 13:
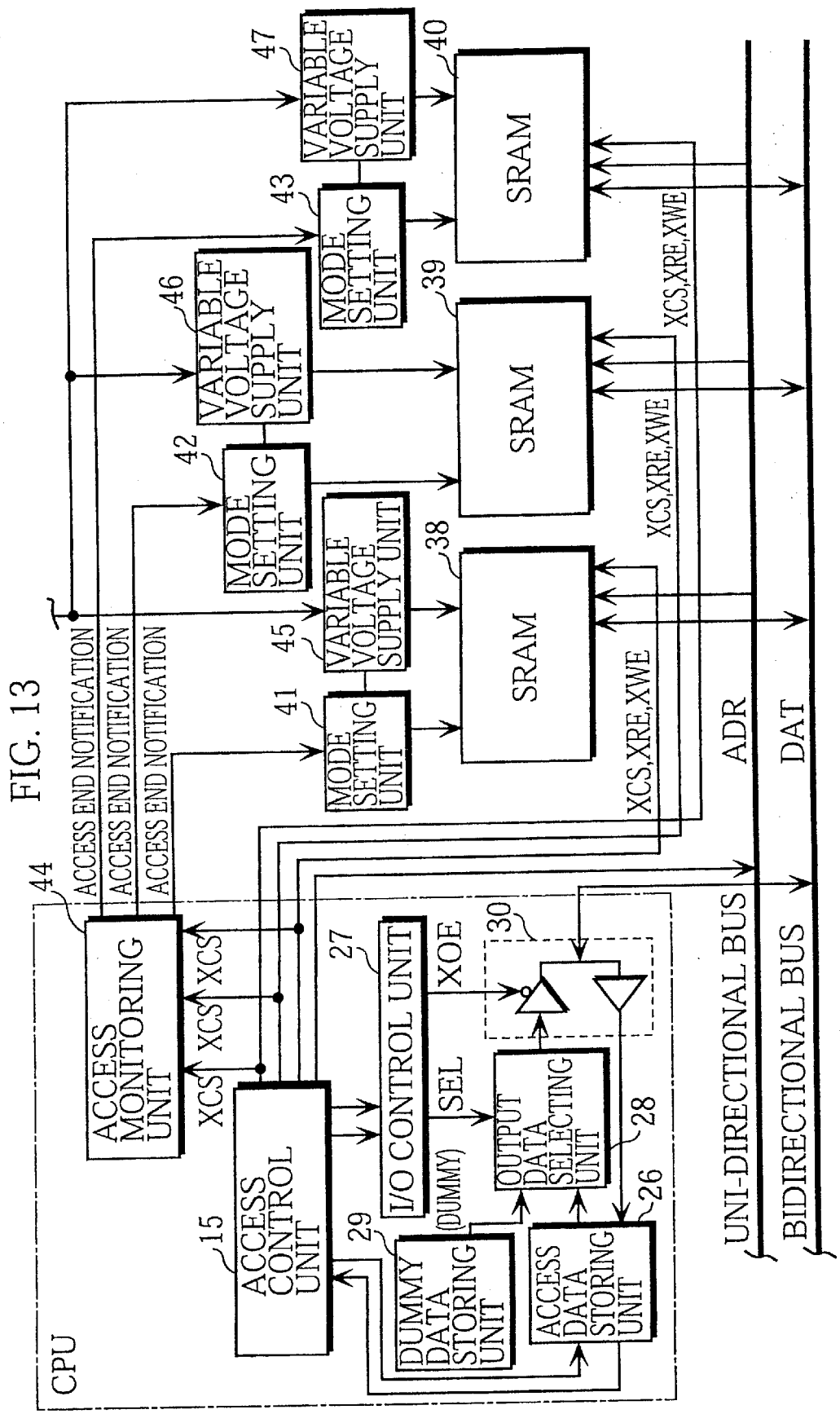
FIG. 13 shows the construction of a bus system for the fifth embodiment.

FIG. 13 shows the construction of a bus system of the present embodiment. This construction is basically the same as that shown in FIG. 2B. The differences between the two are as follows. First, the slave devices composed of the memory 12, the ASIC 13, and the DSP 14 in FIG. 2B are replaced with SRAMs 38–40. Second, the bus system of the present embodiment includes mode setting units 41–43, an access monitoring unit 44, and variable voltage supply units 45–47.

The SRAMs 38–40 are respectively associated with the mode setting units 41–43 and the variable voltage supply unit 45–47. Each of the SRIMs 38–40 have two operating modes: normal mode, in which an access to the SRAM is possible, and low-voltage mode. When an SRAM is placed in low-voltage mode, the SRAM cannot be accessed, but continues to store its contents using less electricity.

The access monitoring unit 44 monitors access to each SRAM placed in normal mode. When the access to one SRAM is completed, the access monitoring unit 44 sends an access end notification to the mode setting unit associated with the SRAM. The access monitoring unit 44 recognizes the end of the access to the SRAM by detecting an XCS signal that has been raised from low to high. For this reason, three XCS signals for the SRAMs 38–40 are inputted to the access monitoring unit 44 as shown in the figure. Here, assume that access to the SRAM 38 is completed and an access end notification is sent to the mode setting unit 41.

On receiving the access end notification from the access monitoring unit 44, the mode setting unit 41 sets the SRAM 38 in low-voltage mode.

The variable voltage supply unit 45 then supplies a voltage predetermined for low-voltage mode to the SRAM 38.

In this way, an SRAM receiving a low XCS signal is set in normal mode, and when the low XCS signal is raised, the SRAM is set in low-voltage mode. Note that the mode setting units 42 and 43 have the same function as the mode setting unit 41, and the variable voltage supply units 46 and 47 have the same function as the variable voltage supply unit 45.

Figure 14:
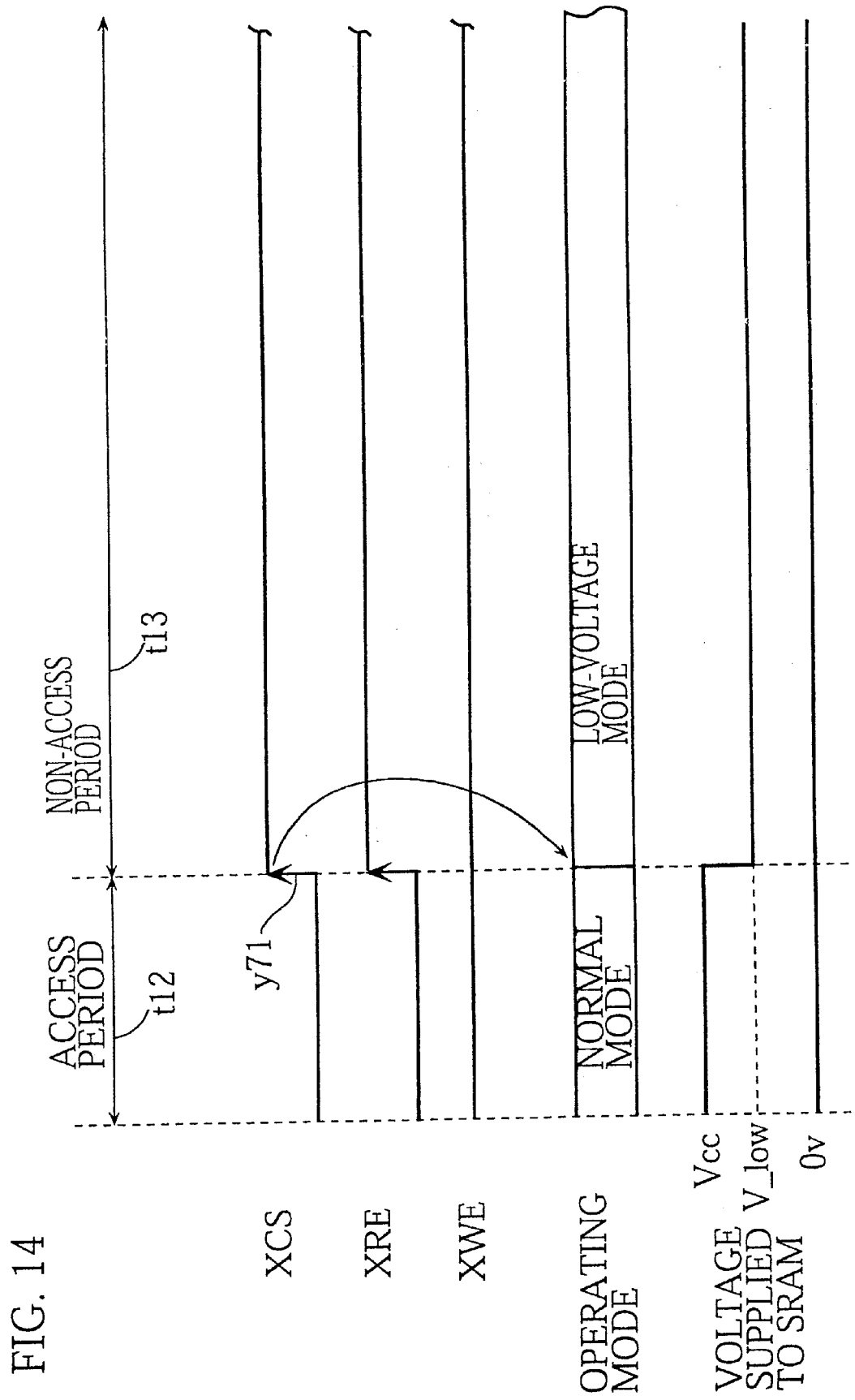
FIG. 14 is a timing chart for a master device of the fifth embodiment.

FIG. 14 is a chart showing timing of: outputting the XCS signal, the XRE signal, and the XWE signal to the SRAM 38; changing the operating mode of the SRAM 38; and changing the voltage supplied to the SRAM 38.

As shown in the chart, the SRAM 38 is set in normal mode during access period t12, but changed to low-voltage mode when the XCS signal is raised as shown by arrow y71. As a result, the voltage supplied to the SRAM 38 is reduced to a voltage "V_low", which is a predetermined voltage for the low-voltage mode, and the SRAM 38 maintains its stored contents using the voltage "V_low".

With the present embodiment, an SRAM is set in normal mode while receiving the low XCS signal, but in low-voltage mode when the low XCS signal is raised. As a result, voltages and power consumption required by the SRAM can be reduced.

Sixth Embodiment

The bus system of the present embodiment is an improvement over the bus system in a set-top box of the fifth embodiment comprising the SRAMs 38–40 having the two operating modes: normal mode and low-voltage mode. In the present embodiment, low-voltage mode is further divided into modes corresponding to different low voltages. These modes have a characteristic in that the lower the voltage, the longer the time taken to revert to normal mode.

The access monitoring unit 44 measures a non-access period for each SRAM that has been set in a low-voltage mode, as well as detecting ends of access to the SRAMs 38–40 as in the fifth embodiment.

When an access to one SRAM is completed, the associated mode setting unit sets the SRAM in a low-voltage mode as in the fifth embodiment. The mode setting unit changes the current low-voltage mode to a lower voltage mode according to the length of the non-access period measured by access control unit 44.

Figure 15:
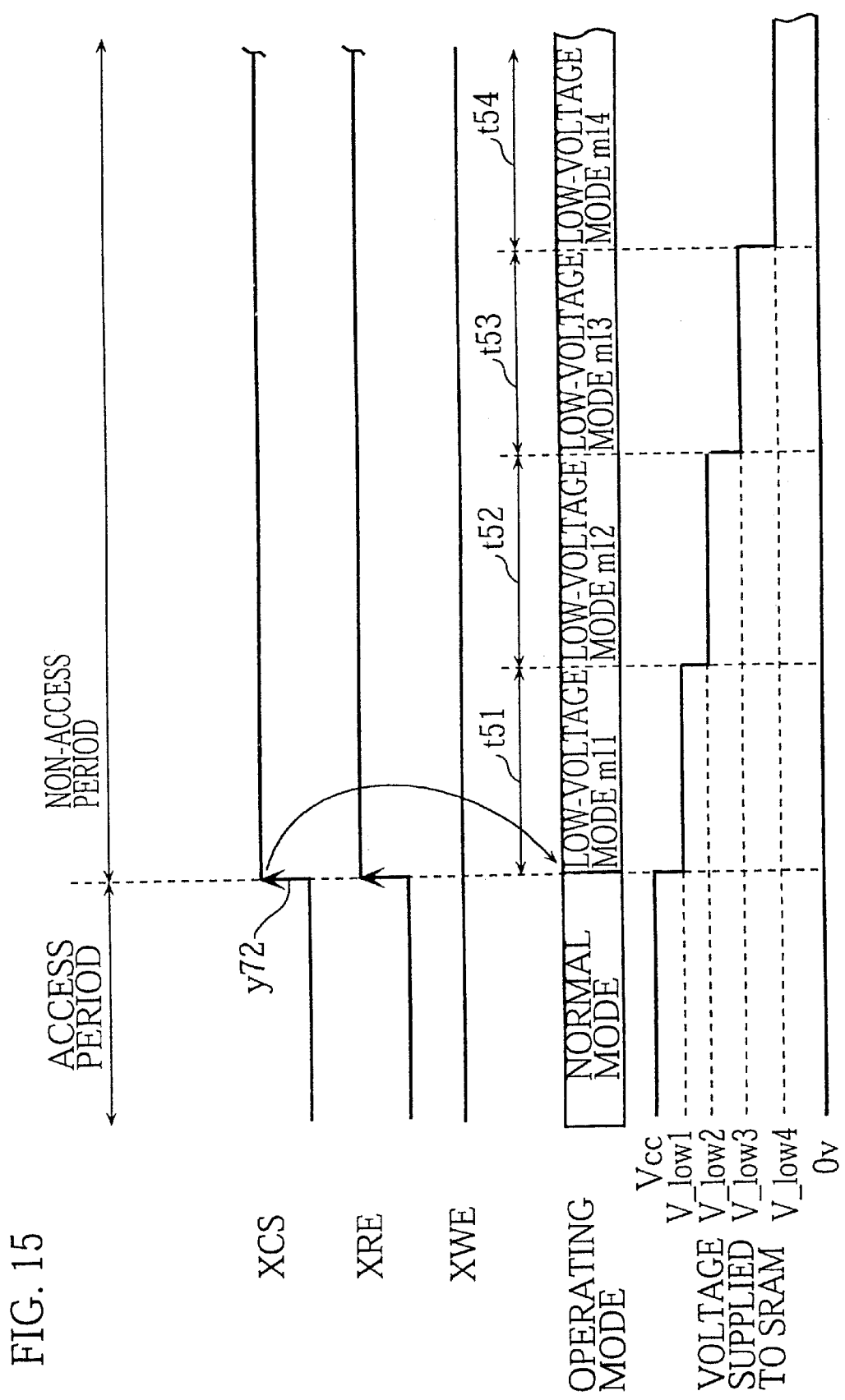
FIG. 15 is a timing chart in which normal mode changes to a low voltage mode when an XCS signal that has been raised is detected.

FIG. 15 is a chart showing timing of: outputting the XCS signal, the XRE signal, and the XWE signal to One of the SRAMs 38–40; changing the operating mode for the SRAM; and changing voltages supplied to the SRAM.

As shown in the chart, when the XCS signal is raised as indicated by arrow y72, the associated variable voltage supply unit sets the SRAM in low-voltage mode m11. Low-voltage mode m11 is one of the plurality of low-voltage modes m11, m12, m13, m14 . . . When an SRAM is set in low-voltage mode m11, the associated variable voltage supply unit supplies a voltage V_low1 to the SRAM, the voltage v_low1 being the highest of all the voltages corresponding to the plurality of low-voltage modes. When the SRAM is set in the low-voltage mode mill the access monitoring unit 44 starts measuring a non-access period for the SRAM. When time t51 has passed, the mode setting unit sets the SRAM in low-voltage mode m12. During the low-voltage mode m12, the variable voltage supply unit supplies a voltage V_low2 to the SRAM. This voltage V_low2 is the second highest voltage among the voltages corresponding to the plurality of low-voltage modes. In the same way, as times t52, t53, and t54 . . . pass, the mode setting unit sets low-voltage modes m13, m14, or the like, and the variable voltage supply unit supplies voltages V_low3, V_low4, or the like to the SRAM.

For the present embodiment, as a non-access period for each SRAM gets longer, the SRAM is set in a lower voltage mode in which the SRAM uses a less voltage to store its contents. As a result, the present bus system involves less power consumption than the bus system of the fifth embodiment.

It is desirable that the above low-voltage modes are set in an SRAM for which reading is performed only once, such as an SRAM that stores character fonts. When using fonts stored in the SRAM, the CPU reads the fonts from the SRAM into a cache memory. Thereafter, the CPU accesses the cache memory so that the characters are displayed quickly. In this case, once the CPU finishes accessing the SRAM which is set in normal mode, the SRAM can be set in a low-voltage mode.

It is also desirable that the above plurality of low-voltage modes corresponding to different voltages are set for an SRAM that stores data rarely accessed, such as font and graphic data to be displayed when a system error occurs.

Seventh Embodiment

With the fifth embodiment, power consumption of each SRAM is reduced by changing operating mode of the SRAM from normal mode to low-voltage mode, whereas with the seventh embodiment a bus system comprises a plurality of ASICs as slave devices. Each ASIC has normal mode and power saving mode as the operating modes. An ASIC set in normal mode receives clock signals of a relatively high frequency, while an ASIC in power saving mode receives clock signals of a relatively low frequency. When the end of an access to an ASIC is detected, the ASIC is set in the power saving mode so that power consumption of the ASIC is reduced.

Figure 16:
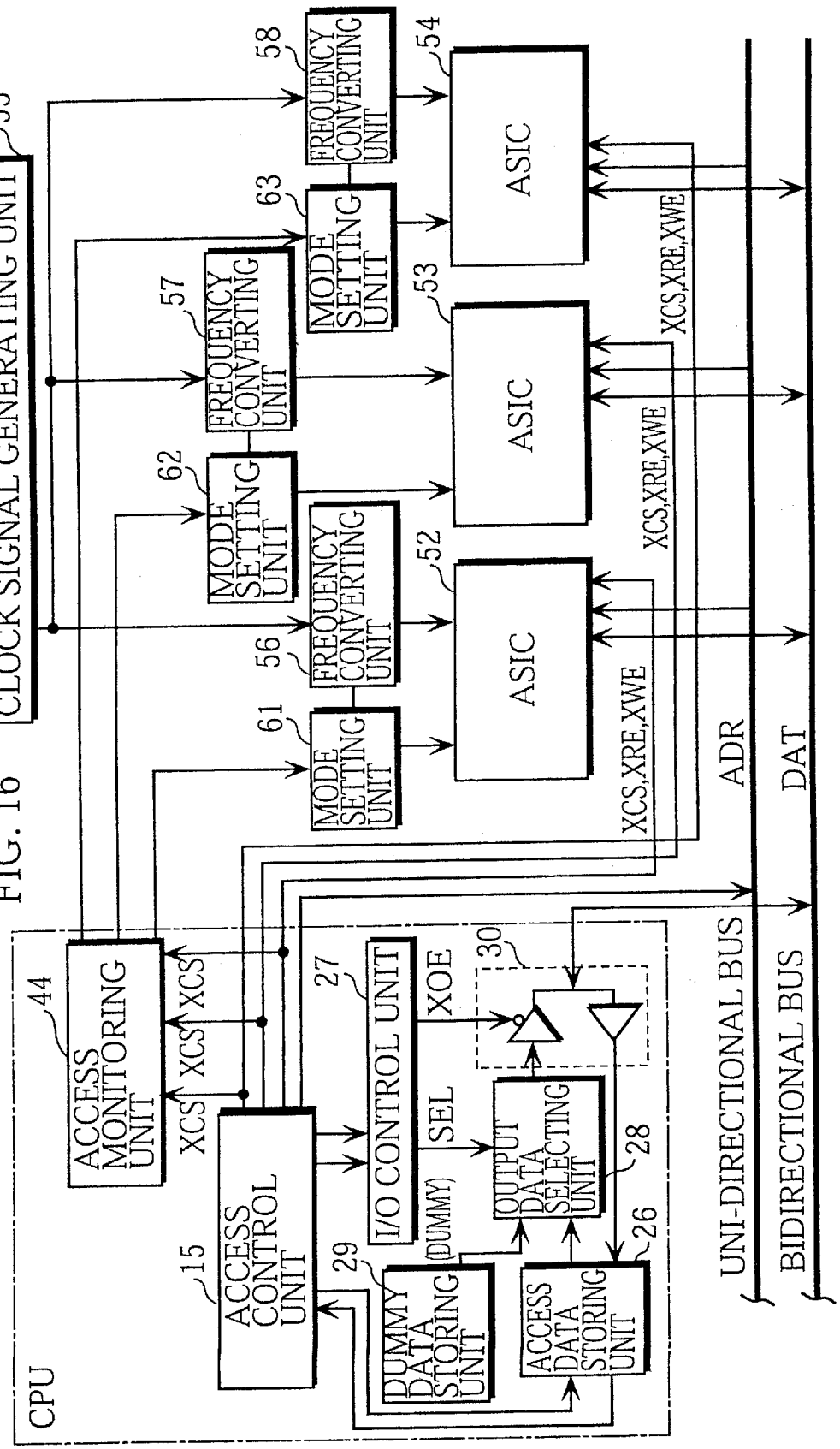
FIG. 16 shows the internal construction of a bus system of the seventh embodiment.

FIG. 16 shows the construction of the bus system of the seventh embodiment. This construction of the bus system is similar to that shown in FIG. 13, although the SWAMs 38–40, the variable voltage supply units 45–47, and the mode setting unit 41–43 in FIG. 13 are respectively replaced with ASICs 52–54, frequency converting units 56–58, and mode setting units 61–63 in the present embodiment. The ASICs 52–54 are associated with the frequency converting units 56–58 arid the mode setting units 61–63, respectively.

The access monitoring unit 44 is the same as that described in the fifth embodiment, which is to say, the access monitoring unit 44 monitors access to each ASIC set in normal mode to detect the end of an access. On detecting the end of an access, the access monitoring unit 44 outputs an access end notification to the associated mode setting unit, Here, assume that the access monitoring unit 44 outputs an access end notification to the mode setting unit 61.

On receiving the access end notification, the mode setting unit 61 sets the ASIC 52 in the power saving mode.

In response to the ASIC 52 having been set in power saving mode, the associated frequency converting unit 56 divides a normal frequency of a synchronous clock signal, which is outputted by a clock signal generating unit 55, to produce a synchronous clock signal with a lower frequency. The frequency converting unit 56 then supplies the synchronous clock signal with the lower frequency to the ASIC 52. Note that the mode setting units 62 and 63 function in the same way as the mode setting unit 61, and the frequency converting units 57 and 58 function in the same way as the frequency converting unit 56.

Figure 17:
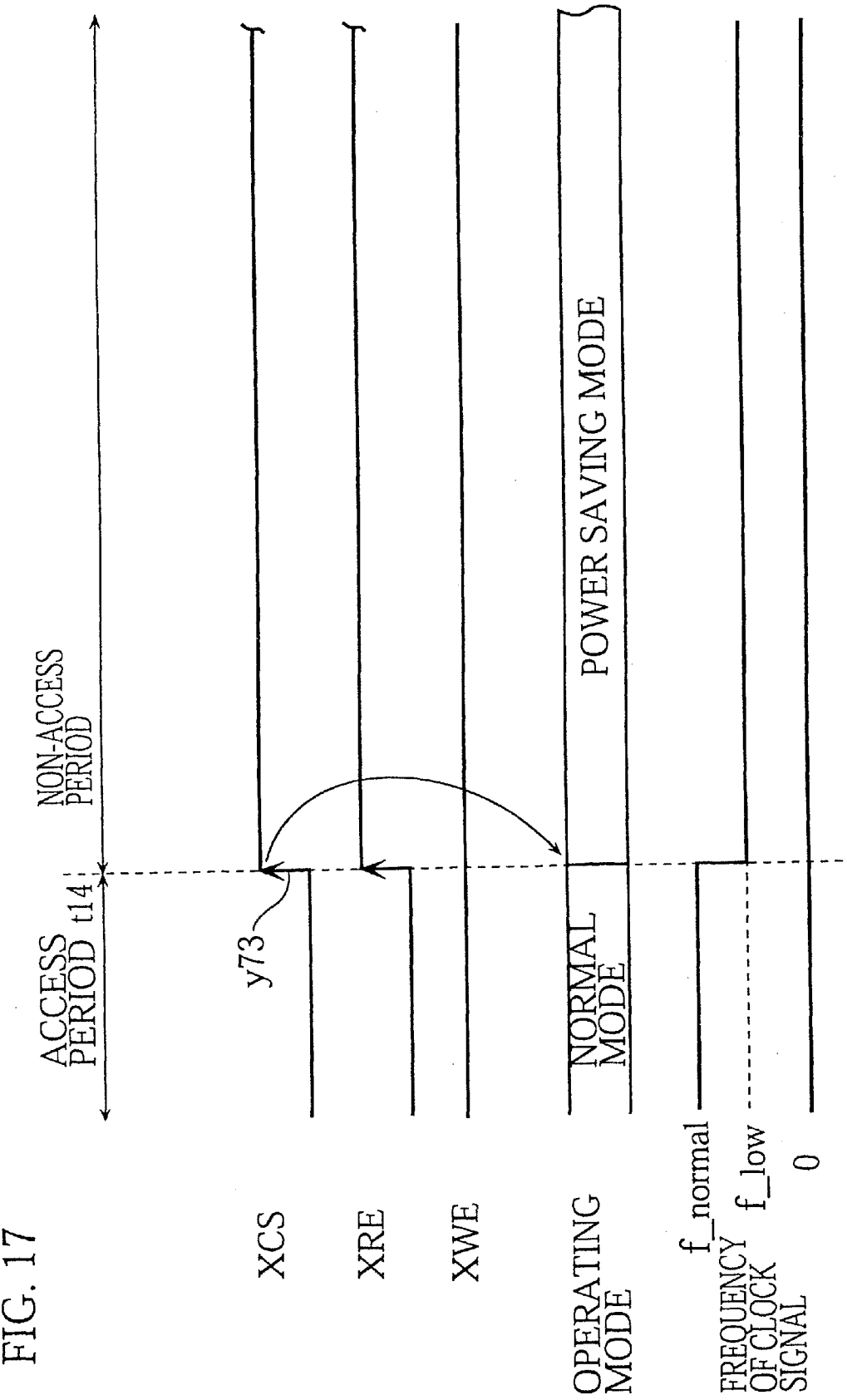
FIG. 17 is a timing chart for a master device of the seventh embodiment.

FIG. 17 is a chart showing timing of: outputting to the ASIC 52 the XCS signal, the XRE signal, and the XWE signal; changing the operation mode of the ASIC 52; and changing a frequency of a synchronous clock signal outputted to the ASIC 52.

As shown in the chart, the ASIC 52 is set in normal mode during access period t14 When the XCS signal is raised as indicated by arrow y73, the mode setting unit 61 associated with the ASIC 52 sets the ASIC 52 in power saving mode. In response to the set power saving mode, the frequency converting unit 56 lowers a frequency of a synchronous clock signal outputted to the ASIC 52 to a frequency "f_low".

With the present embodiment, when an access to an ASIC is completed, the ASIC is set in power saving mode so that power consumption of the ASIC is reduced.

Eighth Embodiment

With the sixth embodiment, an SPAM is set in a lower voltage mode so that it uses a lower voltage to store its contents as a non-access period for the SRAM gets longer, while with the eighth embodiment, as a non-access period for an ASIC passes, the ASIC is set in from power saving mode to operation halt mode.

The construction of the bus system of the present embodiment is basically the same as that shown in FIG. 16 of the seventh embodiment. The differences between the two are as follows.

The access monitoring unit 44 measures a non-access period for each ASIC set in power saving mode as well as detecting the end of access to the ASIC, in the same way as it detects the end of access to the SRAM in the sixth embodiment. Here, assume that the access monitoring unit 44 detects the end of the access to the ASIC 52.

The mode setting unit 61 associated with the ASIC 52 sets the ASIC 52 in power saving mode. At the same time, the access monitoring unit 44 starts measuring a non-access period for the ASIC 52. When this non-access period gets longer than a predetermined period, the mode setting unit 61 sets the ASIC 52 in operation halt mode In response to the above operation halt mode set for the ASIC 52, the frequency converting unit 56 stops supplying the synchronous clock signal.

Figure 18:
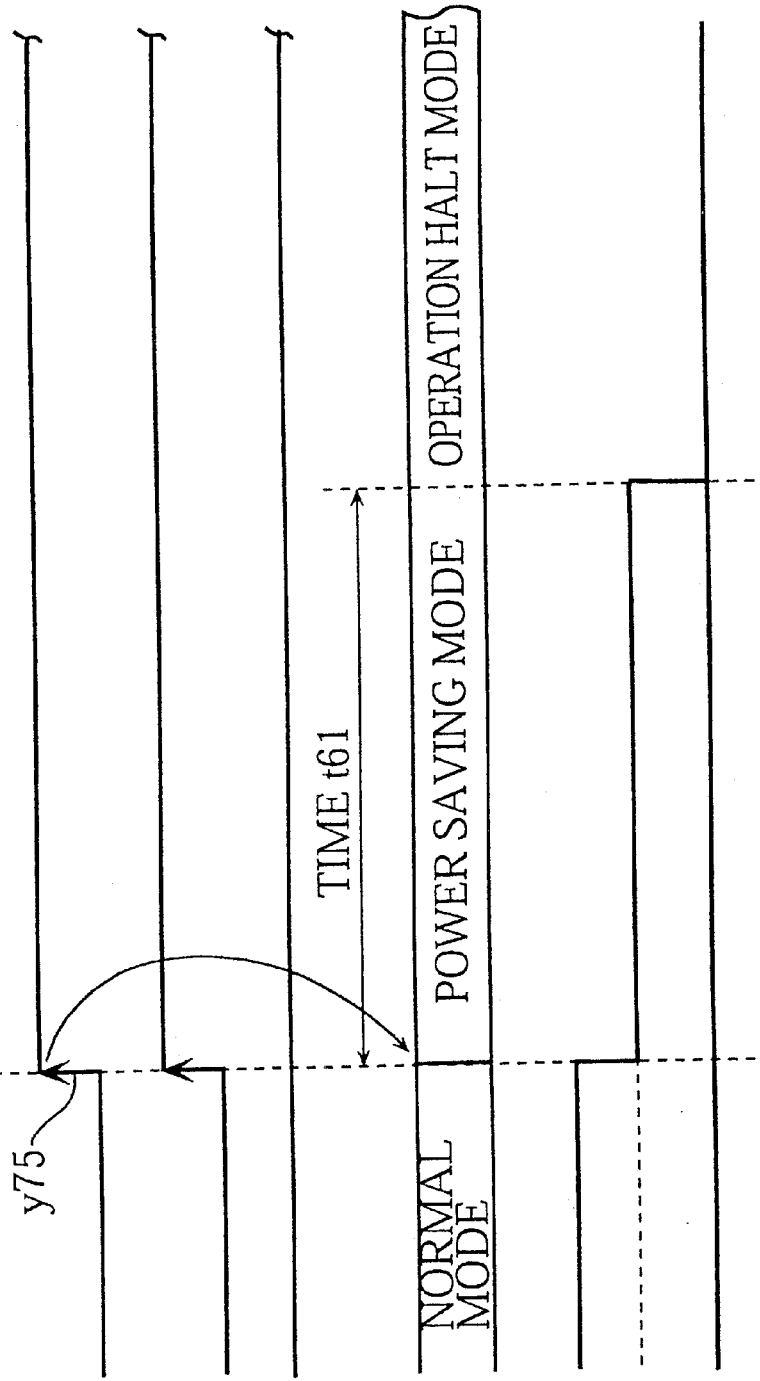
FIG. 18 is a timing chart for the eighth embodiment in which operating mode is changed.

FIG. 18 is a chart showing timing of: outputting the XCS signal, the XRE signal, and the XWE signal to the ASIC 52; changing operating mode set for the ASIC 52; and changing a frequency of a synchronous clock signal outputted to the ASIC 52. As shown in the chart, when the XCS signal is raised as indicated by arrow y75, the mode setting unit 61 sets the ASIC 52 in power saving mode. When the predetermined period t61 has passed, the mode setting unit 61 sets the ASIC 52 in operation halt mode.

With the present embodiment, when a non-access period for an ASIC continues longer than a predetermined period, outputting of a synchronous clock signal to the ASIC stops. As a result, power consumption of the ASIC can be reduced.

Although the present invention has been fully described by way of examples with reference to accompanying drawings, it is to be noted that various changes and modifications will be apparent to those skilled in the art. Therefore, unless such changes and modifications depart from scope of the present invention, they should be construed as being included therein.

What is claimed is:

1. A master device in a system that includes a bus and at least one device, wherein the bus connects the master device with the device, the master device comprising:

a first storing unit for storing data to be written into a device;

a second storing unit for storing dummy data that stabilizes an electrical potential of the bus;

a first management unit for managing whether the system is in an access state in which the master device permits an access to or from one device or a non-access state in which the master device permits an access to or from none of devices;

an output selecting unit for outputting, if the system is in the access state and data is to be written into a device, the data in the first storing unit, and for outputting the dummy data in the second storing unit if the system is in the non-access state;

a driving unit for driving, if the output selecting unit outputs one of the data and the dummy data, the bus with a predetermined current to have the bus transfer the one of the data and the dummy data;

a second management unit for managing a write enable state in which data can be written into one device and a read enable state in which data can be read from one device;

an I/O control unit for outputting an enable signal when the system is one of the write enable state and the non-access state, wherein the driving unit has an input terminal connected to the output selecting unit, an output terminal connected to the bus, and an enable terminal that receives an enable signal, and the driving unit transfers, on receiving one of data and dummy data from the output selecting unit via the input terminal while receiving an enable signal via the enable terminal, the one of the data and the dummy data to the bus via the output terminal;

a separating unit for separating, from data on the bus, data read from a device most recently when the system is in the read enable state, wherein the second storing unit includes a latch unit for latching the separated read data as the dummy data; and a processor core unit that includes a decoding unit for decoding an instruction and an arithmetic unit for performing operations based on the decoded instruction, the processor core unit outputting, based on one of the decoded instruction and the performed operations, an address of a location to be accessed, a request signal for requesting an access to a device, and a specifying signal for indicating whether the access is for a write into or a read from the device, wherein the first management unit sets the system in the access state when the processor core unit outputs a request signal, wherein the second management unit sets the system in the write enable state when a specifying signal outputted with a request signal indicates a write, and in the read enable state when the specifying signal indicates a read, and wherein the first management unit includes:
a timer that starts counting to a predetermined value when the processor core unit outputs a request signal, the predetermined value corresponding to an access period for a device that corresponds to the request signal, and
a setting unit for setting the system in the access state when the timer starts the counting and setting the system in the non-access state when the timer finishes the counting.

2. The master device of claim 1, wherein the I/O control unit includes:
a chip select signal outputting unit for continuously outputting a chip select signal to a device to which the master device permits an access during a period in which the timer counts to a predetermined value for the device and
an enable signal outputting unit for outputting, if a specifying signal that has been outputted indicates a write, a write enable signal to a device corresponding to the specifying signal, and for outputting, if the specifying signal indicates a read, a read enable signal to the device.

3. The master device of claim 2, wherein at least one device is a memory device,
wherein each memory device has a normal mode in which the memory device can be accessed, and a low voltage mode in which the memory device cannot be accessed but maintains stored contents in a low voltage,
wherein the first management unit includes a detecting unit for detecting, when a memory device in the normal mode receives a chip select signal from the chip select signal outputting unit, the memory device as a device currently accessed, and wherein the master device comprises a mode setting unit for setting the detected memory device in the low voltage mode when an access to the detected memory device is completed.

4. The master device of claim 2, wherein at least one device is a memory device,
wherein each memory device has a normal mode and a plurality of low voltage modes and wherein a memory device in the normal mode can be accessed and the memory device in a low voltage mode cannot be accessed but maintains stored contents, a memory device in a lower voltage mode operating in a lower voltage and taking longer time to revert to the normal mode,
wherein the first management unit includes a detecting unit for detecting a memory device in the normal mode receiving a chip select signal from the chip select signal outputting unit as a device currently accessed, and
wherein the master device comprises:
a mode setting unit for setting, when an access to the detected memory device is completed, the memory device in a first low voltage mode which is one of the plurality of low voltage modes and in which a memory device operates in the highest voltage of all voltages corresponding to the plurality of low voltage modes;
a measuring unit for starting to measure, when the mode setting unit sets the memory device in the first low voltage mode, a non-access period for the memory device; and
a mode changing unit for changing the first low voltage mode for the memory device to a lower voltage mode as the non-access period for the memory device gets longer.

5. The master device of claim 2, wherein at least one device is a controller,
wherein each controller has a normal mode in which the controller operates according to a clock signal of a normal frequency, and a power saving mode in which the controller operates according to a clock signal of a lower frequency,
wherein the first management unit includes a detecting unit for detecting, when the chip select signal outputting unit outputs a chip select signal to a controller in the normal mode, the controller as a device currently accessed and
wherein the master device comprises a mode setting unit for setting the detected controller in the power saving mode when an access to the detected controller is completed.

6. The master device of claim 2, wherein at least one device is a controller,
wherein each controller has: a normal mode in which the controller operates according to a clock signal of a normal frequency; a power saving mode in which the controller operates according to a clock signal of a lower frequency; and an operation halt mode in which the controller stops and takes longer time to revert to the normal mode than when the controller is in the power saving mode,
wherein the first management unit includes a detecting unit for detecting a controller in the normal mode receiving a chip select signal from the chip select signal outputting unit as a device currently accessed, and wherein the master device comprises:

a mode setting unit for setting, when an access to the detected controller is completed, the controller in the power saving mode;

a measuring unit for starting to measure, when the mode setting unit sets the controller in the power saving mode, a non-access period for the controller;

a judging unit for judging if the measured non-access period is longer than a predetermined period; and a mode changing unit for changing, if the measured non-access period is longer than the predetermined period, the power saving mode set in the controller to the operation halt mode.

* * * * *